US011288715B2

(12) United States Patent
Wang et al.

(10) Patent No.: US 11,288,715 B2
(45) Date of Patent: Mar. 29, 2022

(54) MULTI-TENANT EXTENSIBLE BILLING SYSTEM

(71) Applicant: Zuora, Inc., Redwood City, CA (US)

(72) Inventors: Xinxin Wang, Sunnyvale, CA (US); Steven Lotito, San Diego, CA (US); Song Cui, Santa Clara, CA (US); Pilar Loren Pickering, San Diego, CA (US); Xin Yu Liu, Mountain View, CA (US); David Kenneth Magill, San Diego, CA (US); Kan Shun Sit, San Jose, CA (US); Zhiguo Lu, Changsha (CN); Chen Xin Sun, Beijing (CN)

(73) Assignee: Zuora, Inc., Redwood City, CA (US)

( * ) Notice: Subject to any disclaimer, the term of this patent is extended or adjusted under 35 U.S.C. 154(b) by 107 days.

(21) Appl. No.: 16/523,538

(22) Filed: Jul. 26, 2019

(65) Prior Publication Data

US 2020/0043064 A1 Feb. 6, 2020

Related U.S. Application Data

(60) Provisional application No. 62/712,875, filed on Jul. 31, 2018.

(51) Int. Cl.
*G06F 3/048* (2013.01)
*G06Q 30/02* (2012.01)
*G06Q 10/06* (2012.01)
*H04L 67/306* (2022.01)
*H04L 67/10* (2022.01)
*G06F 3/0482* (2013.01)

(52) U.S. Cl.
CPC ....... *G06Q 30/0283* (2013.01); *G06F 3/0482* (2013.01); *G06Q 10/0631* (2013.01); *H04L 67/10* (2013.01); *H04L 67/306* (2013.01)

(58) Field of Classification Search
CPC .......... G06F 3/00; G06F 3/048; G06F 3/0482; G06Q 10/06; G06Q 10/0631; G06Q 30/02; G06Q 30/0283; H04L 29/08; H04L 67/10; H04L 67/306
See application file for complete search history.

(56) References Cited

U.S. PATENT DOCUMENTS

| 9,311,664 B2 * | 4/2016 | Bulumulla | G06Q 20/145 |
| 9,870,238 B2 * | 1/2018 | Astete | G06F 9/5077 |
| 10,467,036 B2 * | 11/2019 | Anwar | G06F 11/3442 |

(Continued)

*Primary Examiner* — Hua Lu
(74) *Attorney, Agent, or Firm* — Sheppard, Mullin, Richter & Hampton LLP

(57) ABSTRACT

Receive, by a price calculation microservice, tenant user input from a particular tenant of a multi-tenant system. Generate, by the price calculation microservice, a particular charge model based on the tenant user input. Detect, by a usage microservice, a usage event associated with a customer of the particular tenant of the multi-tenant system. Receive, by a rating microservice, a rating request, the rating request being received in response to the detecting the usage event. Calculate, by the price calculation microservice in response to the receiving the rating request, a usage charge for the usage event based on the particular charge model. Store, by the rating microservice, the usage charge. Generate an invoice based on the usage charge stored by the rating microservice. Provide the invoice to the customer of the particular tenant of the multi-tenant system.

20 Claims, 17 Drawing Sheets

(56) References Cited

U.S. PATENT DOCUMENTS

| | | | |
|---|---|---|---|
| 2009/0089625 A1* | 4/2009 | Kannappan | G06Q 10/10 714/39 |
| 2010/0049570 A1* | 2/2010 | Li | G06Q 10/06 718/104 |
| 2014/0075032 A1* | 3/2014 | Vasudevan | H04L 41/5048 709/226 |
| 2014/0244851 A1* | 8/2014 | Lee | H04L 12/4641 709/228 |
| 2014/0289391 A1* | 9/2014 | Balaji | H04L 43/04 709/224 |
| 2014/0324650 A1* | 10/2014 | Bligh | G06Q 30/04 705/34 |
| 2014/0337500 A1* | 11/2014 | Lee | H04L 67/10 709/223 |
| 2015/0039930 A1* | 2/2015 | Babashetty | G06F 11/2094 714/4.11 |
| 2015/0058471 A1* | 2/2015 | McPherson | H04L 12/1432 709/224 |
| 2015/0124829 A1* | 5/2015 | Koodli | H04L 12/4633 370/392 |
| 2015/0134797 A1* | 5/2015 | Theimer | H04L 41/24 709/223 |
| 2015/0249707 A1* | 9/2015 | Morgan | H04L 67/1002 709/226 |
| 2015/0278243 A1* | 10/2015 | Vincent | G06F 16/182 707/634 |
| 2016/0004882 A1* | 1/2016 | Ballai | G06F 16/113 726/30 |
| 2016/0094401 A1* | 3/2016 | Anwar | G06F 11/3006 709/223 |
| 2016/0112475 A1* | 4/2016 | Lawson | H04L 67/2823 709/204 |
| 2016/0124742 A1* | 5/2016 | Rangasamy | H04L 41/0803 717/103 |
| 2016/0344651 A1* | 11/2016 | Kusters | H04M 15/7655 |
| 2017/0118251 A1* | 4/2017 | Roth | G06F 3/011 |
| 2017/0236213 A1* | 8/2017 | Shak | G06Q 10/10 705/30 |
| 2017/0310494 A1* | 10/2017 | McPherson | H04L 41/5029 |
| 2017/0344618 A1* | 11/2017 | Horowitz | G06F 11/2097 |
| 2018/0034924 A1* | 2/2018 | Horwood | H04L 67/16 |
| 2019/0095241 A1* | 3/2019 | Ago | G06F 16/24573 |
| 2020/0067789 A1* | 2/2020 | Khuti | G06F 16/254 |

\* cited by examiner

FIG. 7B

| | Home | |
|---|---|---|
| | Charge Model Definitions | Create Charge Model |
| △ Customers ‹ | | |
| Customers Accounts | Create Charge Model | |
| Subscriptions | Autofill Template | |
| Orders | Pre-rated Per Unit Pricing | |
| ⊿ Insights ‹ | | |
| Segments | Model Name | |
| Accounts | PerUnitCustomChargeModel | |
| Exports | Display Name | |
| ⊞ Products ‹ | Per Unit Pricing | |
| Products Catalog | Description | |
| ⊟ Billing ‹ | Price is determined by unit price times quantiy | |
| Overview | Model Logic | |
| Invoices | Source | |
| Bill Runs | ocm://perunit | |
| Invoice Item | Type | |
| Adjustments | EMBEDDED | |
| Usage | Dependencies | |
| ⊕ Payments ‹ | DEPENDENCY TYPE | CONFIG MAP |
| Overview | USAGE_DATA | ConfigMap ⊕ |
| Payments | Model Parameter Schema | |
| Payment Runs | PHASE | SCHEMA STRING |
| Refunds | | "minLength":1 |
| Payment Methods | | } |
| Payment Method | PRODUCT_CATALOG ⌄ | ], "required": [ ⊕ |
| Updater | | "unitPrice" |
| ⊞ Finance ‹ | | }. |
| Overview | | Type. Sting |
| Accounting Periods | | "minLength ":1 |
| Mass Updater | | } |
| ⊙ Reporting ‹ | ORDER ⌄ | ], "required": [ ⊕ 🗑 |
| Reporting | | "unitPrice" |
| Data Sources | | }. |
| Exports | | |
| Developer Tools | [Create] | |

MULTI-TENANT EXTENSIBLE BILLING SYSTEM

CROSS-REFERENCE TO RELATED APPLICATIONS

The present application claims the benefit of U.S. Provisional Patent Application Ser. 62/712,875, filed Jul. 31, 2018 and entitled "Extensible Billing System," which is hereby incorporated by reference herein.

TECHNICAL FIELD

This disclosure pertains to multi-tenant computing systems. More specifically, this disclosure pertains to multi-tenant extensible billing systems.

BACKGROUND

Under conventional approaches, billing systems may generate invoices from billing data. For example, a customer may purchase a number of units (e.g., 20 units) of a physical good (e.g., lumber). The physical good may cost $10 per unit. The billing system may generate an invoice for a total price (e.g., $200) based on the number of units purchased and the price of each unit. However, such billing systems typically rely only on monolithic applications, and are therefore not efficiently scalable. Furthermore, various features of such billing systems cannot typically be optimized for computational efficiency. For example, certain features may require more memory and less processing power than other features, and some features may require more processing power and less memory than other features. Additionally, such billing systems may not be able to accurately calculate billing information for subscription-based services (e.g., a Netflix subscription, an AT&T internet service subscription, and/or the like).

SUMMARY

A claimed solution rooted in computer technology overcomes problems specifically arising in the realm of computer technology. In various embodiments, a multi-tenant computing system implements a scalable microservice-based extensible billing system that is configured to allow tenant users (e.g., an AT&T administrator) to create custom charge models based on their own requirements (e.g., business requirements and/or computing requirements). For example, a charge model may include data definitions and logic definitions, each of which can be defined by the tenant user interacting with the computing system (e.g., via one or more graphical user interfaces). The data definitions may define inputs for the custom charge model, such as customer information (e.g., zip code information), data formats (e.g., five-digits for zip code information), and system information (e.g., payment methods, billing periods, billing frequency). Logic definitions may include one or more operations to be applied using the model inputs. In some embodiments, the custom charge models may be easily created by tenant users using a self-describing model definition language (e.g., a JSON-based schema language). In one example, a tenant user may be able to define a custom charge model that provides a discount for cellular telephone service usage during a particular period of time (e.g., between 12 AM and 5 AM). Accordingly, when charges are calculated for a customer, that discount may be automatically calculated using the custom charge model (e.g., at the time of the usage). Furthermore, since the computing system implements a microservice architecture, the computing system may easily scale to handle billions of calculations in real-time.

Various embodiments of the present disclosure include systems, methods, and non-transitory computer readable media configured to receive, by a price calculation microservice, tenant user input from a particular tenant of a multi-tenant system. Generate, by the price calculation microservice, a particular charge model based on the tenant user input received from the particular tenant of the multi-tenant system. Detect, by a usage microservice, a usage event associated with a customer of the particular tenant of the multi-tenant system. Receive, by a rating microservice, a rating request, the rating request being received in response to the detecting the usage event associated with the customer of the particular tenant of the multi-tenant system. Calculate, by the price calculation microservice in response to the receiving the rating request, a usage charge for the usage event based on the particular charge model. Store, by the rating microservice, the usage charge. Generate an invoice based on the usage charge stored by the rating microservice. Provide the invoice to the customer of the particular tenant of the multi-tenant system.

In some embodiments, the tenant user input comprises a data definition and a logic definition, the data definition defining data requirements for calculating the usage charge, and the logic definition defining one or more operations capable of being performed on data corresponding to the data requirements when calculating the usage charge.

In some embodiments, the particular charge model is generated in response to the receiving the tenant user input from the particular tenant of the multi-tenant system.

In some embodiments, the data definition defines system data requirements and customer data requirements, the system data requirements corresponding to system data stored by the computing system, and the customer data requirements corresponding to customer data stored by a third-party system of the particular tenant.

In some embodiments, the particular charge model is generated from a template charge model.

In some embodiments, the tenant user input is received through an interface microservice. In some embodiments, the interface microservice comprises a graphical user interface microservice. In some embodiments, the interface microservice comprises an application programming interface (API) microservice.

In some embodiments, the systems, methods, and non-transitory computer readable media further configured to perform storing the particular charge model; obtaining, by another tenant of the multi-tenant system, the particular charge model; receiving, by another price calculation microservice, a modification input from the another tenant of the multi-tenant system; modifying, by the another price calculation microservice based on the modification input, the particular charge model; and storing the modified particular charge model.

In some embodiments, the price calculation microservice is stateless and the usage microservice is not stateless.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like refer-

BRIEF DESCRIPTION OF THE DRAWINGS

Figure 7B:
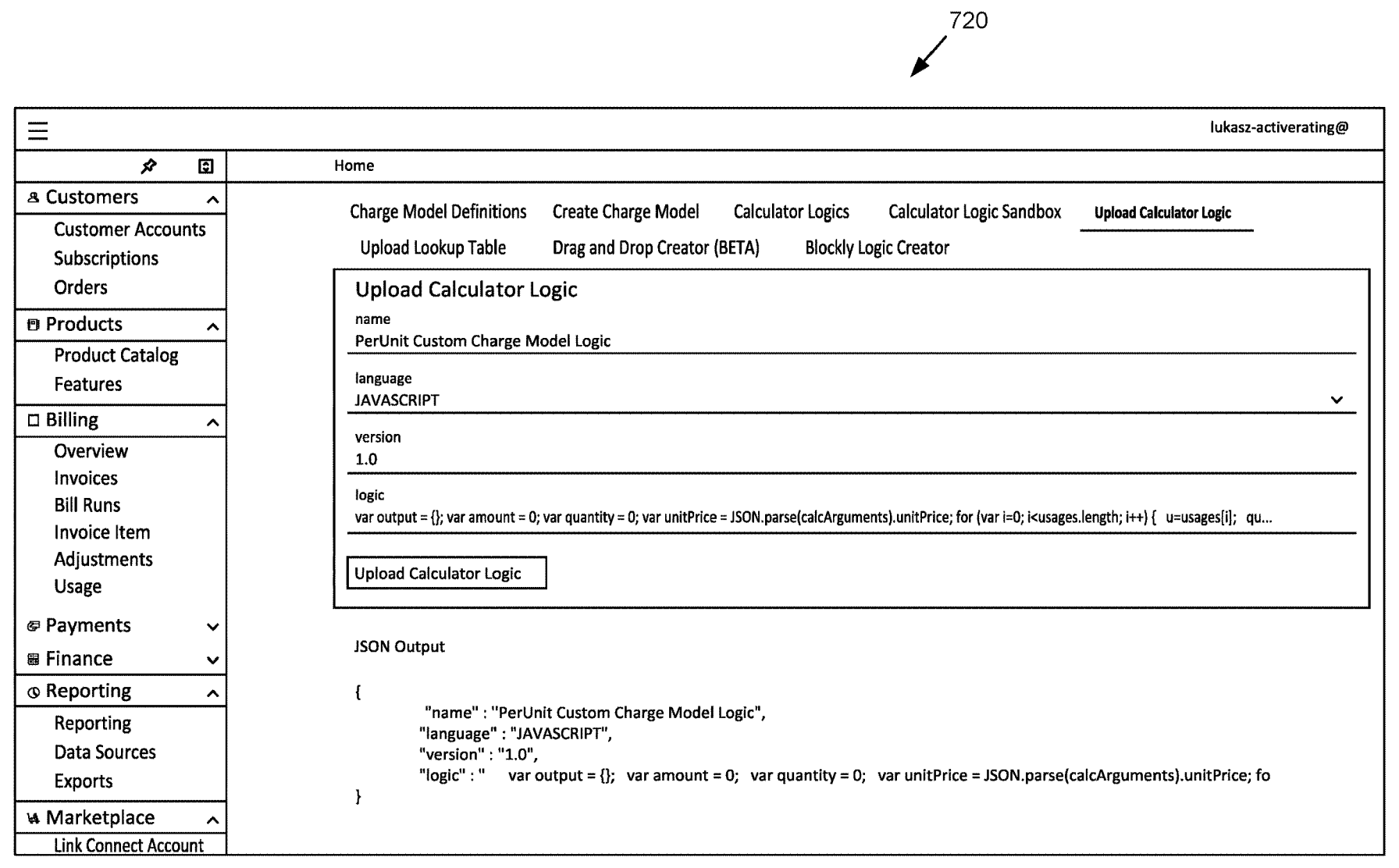
Figure 7D:
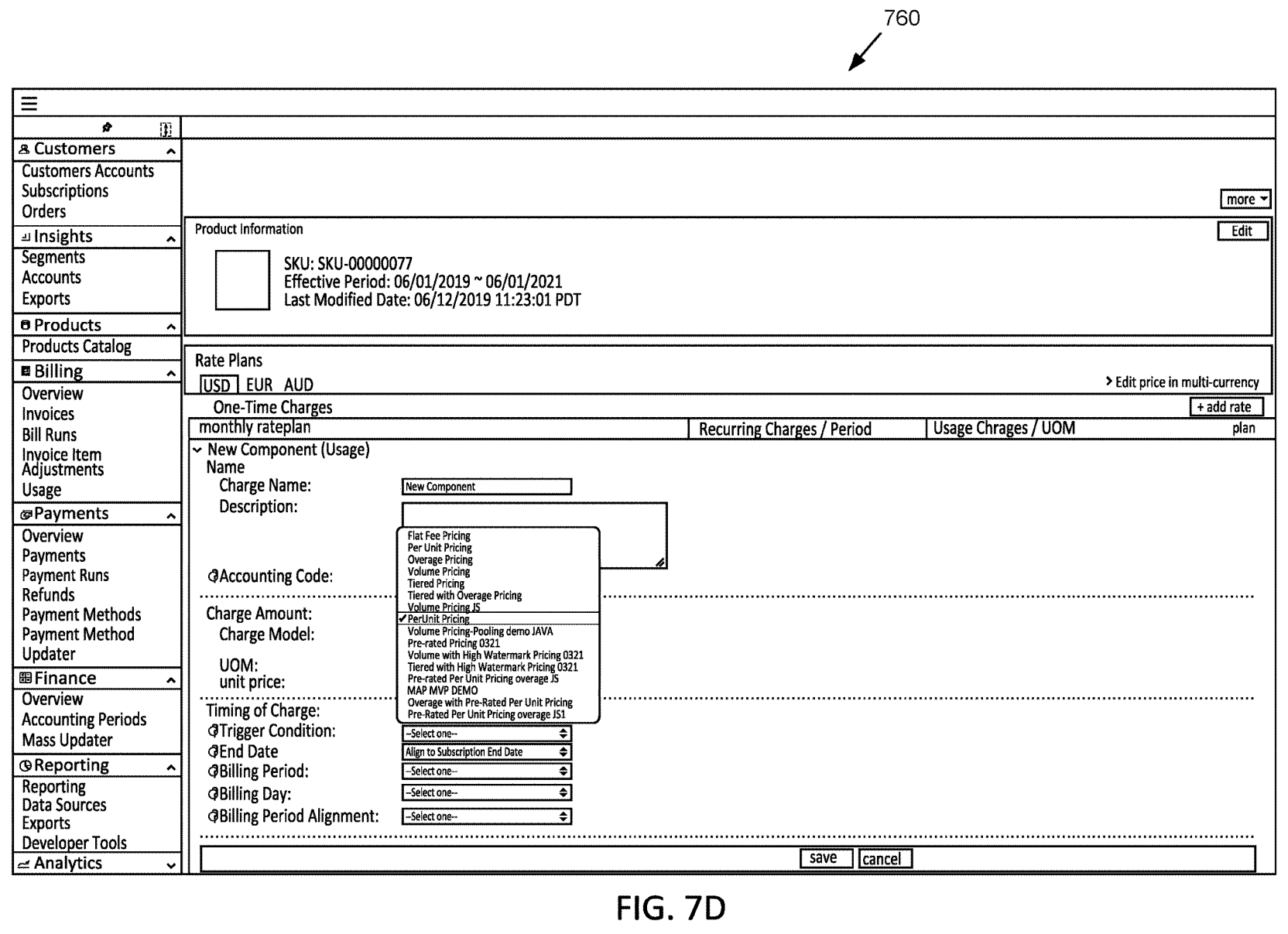

FIGS. 7A-D depict example graphical user interfaces for creating a charge model according to some embodiments.

DETAILED DESCRIPTION

Under some approaches, a subscription billing system computes how much a customer of a tenant of a multi-tenant system should pay for a subscription plan at the end of a billing period. For example, the subscription billing system may compute how much a particular customer (e.g., John Smith) of AT&T should pay for an AT&T cellular telephone service subscription at the end of each month. To set up billing, a tenant user (e.g., an AT&T administrator) may be able to interact with the subscription billing system to select a predefined charge model from a set of predefined charge models. For example, the set of the predefined charge models may be hard-coded (e.g., not modifiable) charge models created by experienced software developers, and the tenant users cannot create new charge models and/or modify the predefined charge models. The subscription billing system may not be easily scalable, and/or may not be customizable for specific tenant requirements (e.g., business requirements and/or computing requirements).

A claimed solution rooted in computer technology overcomes problems specifically arising in the realm of computer technology. In various embodiments, a multi-tenant computing system implements a scalable microservice-based extensible billing system that is configured to allow tenant users (e.g., an AT&T administrator) to create custom charge models based on their own requirements (e.g., business requirements and/or computing requirements). For example, a charge model may include data definitions and logic definitions, each of which can be defined by the tenant user interacting with the computing system (e.g., via one or more graphical user interfaces). The data definitions may define inputs for the custom charge model, such as customer information (e.g., zip code information), data formats (e.g., five-digits for zip code information), and system information (e.g., payment methods, billing periods, billing frequency). Logic definitions may include one or more operations to be applied using the model inputs. In some embodiments, the custom charge models may be easily created by tenant users using a self-describing model definition language (e.g., a JSON-based schema language). In one example, a tenant user may be able to define a custom charge model that provides a discount for telephone service usage during a particular period of time (e.g., between 12 AM and 5 AM). Accordingly, when charges are calculated for a customer, that discount may be automatically calculated using the custom charge model (e.g., at the time of the usage). Furthermore, since the computing system implements a microservice architecture, the computing system may easily scale to handle billions of calculations in real-time.

Figure 1:
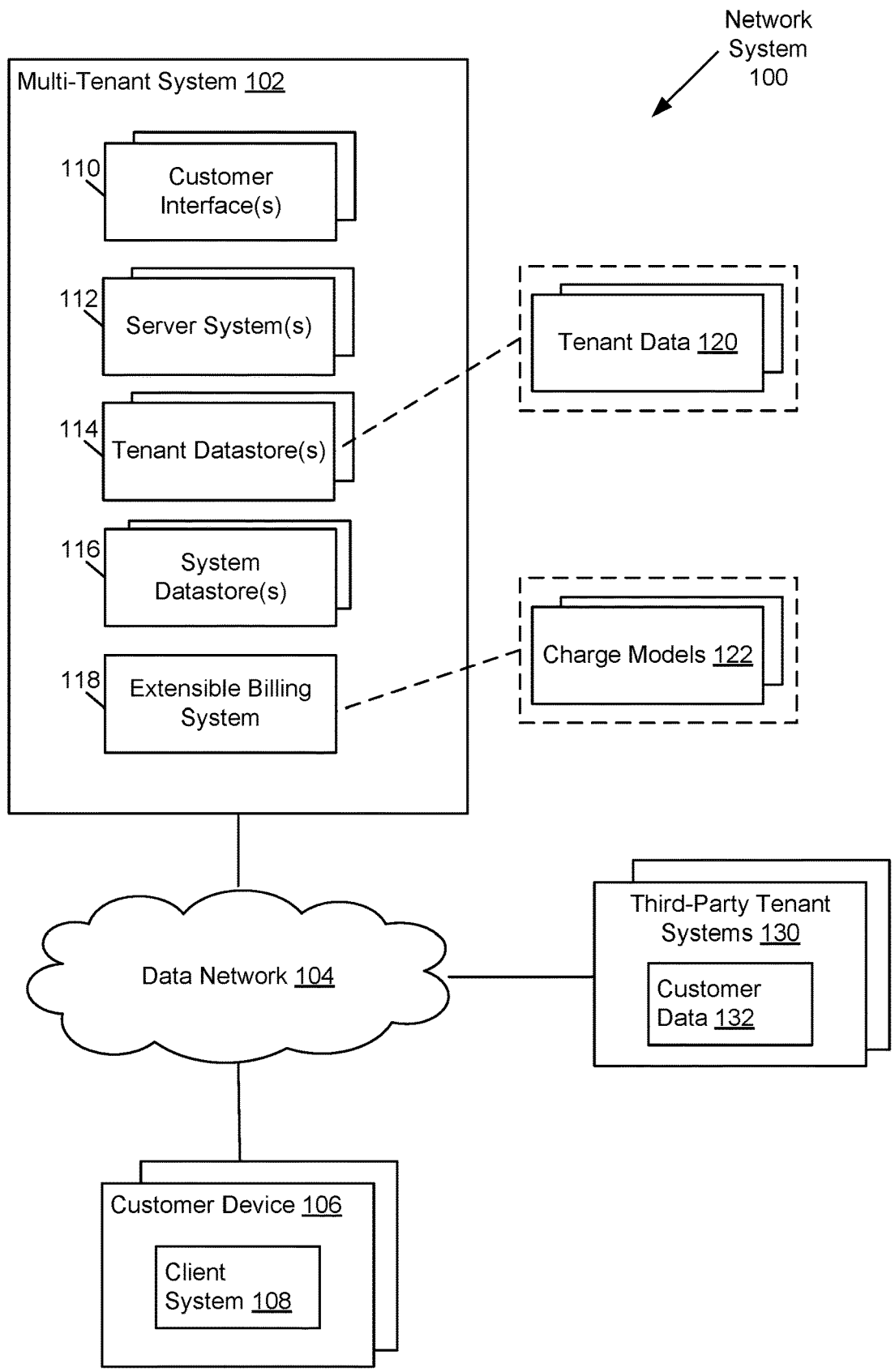
FIG. 1 depicts a diagram of an example network system for providing multi-tenant extensible billing according to some embodiments.

FIG. 1 depicts a diagram of an example network system 100 for providing multi-tenant extensible billing according to some embodiments. In the example of FIG. 1, the network system 100 provides cloud-based software-as-a-service (SAAS) services of a multi-tenant system 102 to multiple tenants. Examples of the cloud-based SAAS services include data storage, data processing, and business-oriented applications. In some embodiments, each tenant may be a subscription-based entity or provider (e.g., an internet service provider, a home security system and service provider, a cellular phone service provider, or entertainment content provider). Each tenant may include a group of one or more users (e.g., individuals, business entities, customers of the business entities, systems) who share access to the cloud-based services. In one embodiment, a tenant includes a service entity such as AT&T, Netflix, Verizon, and/or the like. A tenant may include one or more products or services of an entity. For example, AT&T internet products may be a particular tenant, and AT&T security products may be another tenant. In some embodiments, the cloud-based SAAS services relate to managing subscriber records, product and/or service consumption information, billing information, payment information, and/or the like.

The network system 100 includes the multi-tenant system 102 coupled via a data network 104 (e.g., a set of one or more public and/or private, wired and/or wireless networks) to customer devices 106. The multi-tenant system 102 includes shared resources to host the cloud-based SAAS services to the tenants. The shared resources may include processors, memory, virtual systems, services, application programs, load balancers, firewalls, and/or the like. As shown, the multi-tenant system 102 includes tenant interfaces 110, server systems 112, tenant datastores 114, server system datastores 116, and an extensible billing system 118. Each of the client devices 106 includes a client system 108 that accesses the cloud-based SAAS services hosted by the multi-tenant system 102. In some embodiments, the client systems 108 may be operated by employees (e.g., administrator users) of the provider of the provider of the multi-tenant system 102. In some embodiments, the client systems 108 may be operated by employees of the tenant. In some embodiments, the client systems 108 may be operated by end users of the tenant's services.

Each client device 106 may include a desktop, laptop, notebook, tablet, personal digital assistant, smart phone, or other consumer electronic devices incorporating one or more computer components. The client system 108 on each client device 106 may include hardware, software and/or firmware for communicating with the multi-tenant system 102 and accessing the cloud-based services it hosts. Examples of the client systems 108 may include web browsers, client engines, drivers, user interface components, proprietary interfaces, and/or the like.

The third-party tenant systems 130 may function store customer data 132. For example, a third-party tenant system 130 may be a system of AT&T or other tenant of the multi-tenant system 102. The third-party tenant systems 130 may be operated, owned, and/or controlled by the tenant (e.g., AT&T) of the multi-tenant system 102, and may not be operated, owned, and/or controlled by the multi-tenant system 102. The third-party tenant systems 130 may comprise computing devices (e.g., servers), datastores, and/or the like. The third-party tenant systems 130 may maintain and/or provide customer data 132 to remote systems (e.g., the multi-tenant system 102). For example, the third-party tenant systems 130 may push data and/or provide data in response to a pull request (e.g., from the multi-tenant system 102). The customer data 132 may comprise data that the customer wants to store and/or maintain locally (e.g., under the customer's control), and not in another entity's system (e.g., the multi-tenant system 102). For example, customer data 132 may comprise personal information (e.g., address information) of customers of the tenant (e.g., an AT&T end-user subscriber).

The multi-tenant system 102 includes hardware, software and/or firmware to host the cloud-based services for the tenants. It will be appreciated that the typical multi-tenant system 102 may offer access to shared resources including systems and applications on shared devices and offer each tenant the same quality or varying qualities of service. In some embodiments, the multi-tenant system 102 does not use virtualization or instantiation processes. In some embodiments, a multi-tenant system 102 integrates several business computing systems into a common system with a view toward streamlining business processes and increasing efficiencies on a business-wide level.

In some embodiments, the multi-tenant system 102 includes a user interface tier of multiple tenant interfaces 110, a server tier of multiple server systems 112, a datastore tier of multiple tenant datastores 114 for the multiple tenants, one or more system datastores 116, and an extensible billing system 118. In some embodiments, the tenant interfaces 110 includes graphical user interfaces and/or web-based interfaces to enable tenants to access the shared services hosted by the multi-tenant system 102. The tenant interfaces 110 may support load balancing when multiple tenants (and/or multiple customers of the tenants) try to access the multi-tenant system 102 concurrently. The tenant interfaces 110 may additionally or alternatively include an operator interface for use by a systems operator to configure or otherwise manage the multi-tenant system 102. In some embodiments, each tenant may be associated with a subset of the total tenant interfaces 114 for load balancing.

In some embodiments, the server systems 112 include hardware, software and/or firmware to host the shared services for tenants. The hosted services may include tenant-specific business services or functions, including enterprise resource planning (ERP), customer relationship management (CRM), eCommerce, Human Resources (HR) management, payroll, financials, accounting, calendaring, order processing, subscription billing, inventory management, supply chain management (SCM), collaboration, sales force automation (SFA), marketing automation, contact list management, call-center support, web-based customer support, partner and vendor management systems, product lifecycle management (PLM), financial, reporting and analysis, and/or the like. Similar to the tenant interfaces 110, in some embodiments, the server systems 112 may support load balancing when multiple tenants (and/or multiple customers of tenants) try to access the multi-tenant system 102 concurrently. Further, in some embodiments, each tenant may be associated with a subset of the total server systems 112 for load balancing.

In some embodiments, tenant data 120 for each tenant may be stored in a logical store across one or more tenant datastores 114. In some embodiments, each tenant uses a logical store that is not assigned to any predetermined tenant datastores 114. Each logical store may contain tenant data 120 that is used, generated and/or stored as part of providing tenant-specific business services or functions. In some embodiments, the tenant datastores 114 may include relational database management systems (RDBMS), object-based database systems, and/or the like. In some embodiments, tenant data 120 may be stored across multiple tenant datastores 114, with each datastore dedicated to a particular service (e.g., managing customer records, managing product and/or service consumption information, managing billing information, managing payment information, and/or the like).

In some embodiments, the tenant data 120 may include subscription information, such as billing data and/or subscription status (e.g., active, canceled, suspended, re-activated). Billing data may include billing invoice data (e.g., date of invoices and invoice amounts, overage charge dates and overage charge amounts), payment transaction data (e.g., date of payments, amount of payments), payment methods (e.g., credit card, debit card), payment plan (e.g., annual billing, monthly billing), and/or service plan information (e.g., the name of a service plan). Subscription information may also include a geographic region and/or location associated with a tenant, service, and/or subscriber. In some embodiments, the tenant data 120 may include usage data (e.g., account activity data), such as new subscriptions, changes to subscribed products and/or services, cancellation of one or more products and/or services, subscriptions to new products and/or services, application of discounts, loyalty program package changes (e.g., additional programs and/or services, special rates, and/or the like for loyal customers), reduction or increase of rates for products and/or services, and/or cancellation of the application. In some embodiments, account activity may include usage of a product and/or product of a subscriber (e.g., what channels the subscriber actually watches, what services and what level of consumption the subscriber receives, quality of the product and/or services, and/or the like).

In some embodiments, the tenant data 120 may be stored in one or more data formats (or, simply, formats). For example, subscription tenant data may be stored in a particular format, and usage tenant data may be stored in another format. As used herein, formats may include data types, variable types, protocols (e.g., protocols for accessing, storing, and/or transmitting data), programming languages, scripting languages, data value parameters (e.g., date formats, string lengths), endpoint locations and/or types, and/or the like.

In some embodiments, the multi-tenant system 102 may function to create, read, update, and/or delete charge models 122. The multi-tenant system 102 may provide graphical user interfaces for creating, reading, updating, and/or deleting custom charge models 122 that are tailored to the specific business and/or computational requirements of the tenants. The custom charge models 122 may allow the multi-tenant system 102 to efficiently utilize shared resources of the multi-tenant system 102. In some embodiments, the multi-tenant system 102 may create and/or execute charge models 122 as microservices, which can be spun-up with appropriate allocation of shared multi-tenant system 102 resources, and shutdown when not needed. For example, the multi-tenant system 102 may provide more processing resources to particular microservices, and more memory resources to other microservices. Accordingly, this architecture may improve robustness of the multi-tenant system 102 and allow each component to be individually scaled as needs arise.

The data network (or, communication network) 104 may represent one or more computer networks (e.g., LAN, WAN, or the like) or other transmission mediums. The data network 104 may provide communication between the systems, engines, datastores, and/or devices described herein. In some embodiments, the data network 104 includes one or more computing devices, routers, cables, buses, and/or other network topologies (e.g., mesh, and the like). In some embodiments, the data network 104 may be wired and/or wireless. In various embodiments, the data network 104 may include the Internet, one or more wide area networks (WANs) or local area networks (LANs), one or more networks that may be public, private, IP-based, non-IP based, and so forth.

Figure 2:
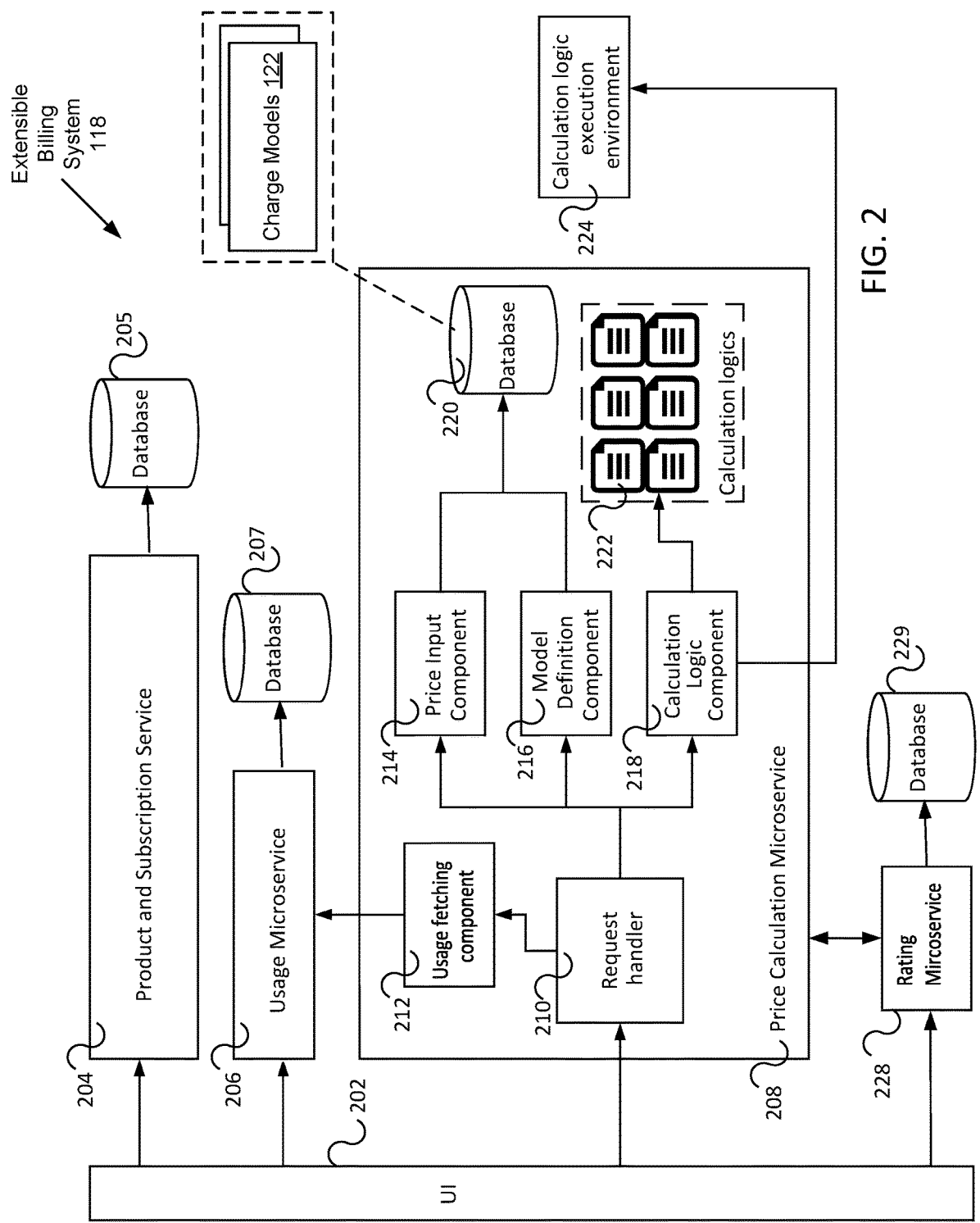
FIG. 2 depicts a diagram of an example of an extensible billing system according to some embodiments.

FIG. 2 depicts a diagram of an example of an extensible billing system 118 according to some embodiments. In the example of FIG. 2, the extensible billing system 118 includes a user interface (UI) layer 202, a product and subscription service 204, a usage microservice 206, a price calculation microservice 208, and a rating microservice 228.

The UI layer 202 may function to provide graphical user interfaces to interact with the extensible billing system 118 and/or other components of the multi-tenant system 102. The UI layer 202 may comprise a set of one or more microservices. Using the UI layer 202, a tenant user may define charge model computation logic 222 (e.g., as defined in step 802 of FIG. 8). Details for defining charge model computation logic 222 may be found in FIG. 9 and FIG. 10.

The UI layer 202 may function to allow users (e.g., tenant users and/or extensible billing system 118 administrators) to create products (e.g., cellular telephone service), product rate plans (e.g., monthly recurring flat fee, such as $39.99 per month), associated custom charge models 122 (e.g., a custom flat fee charge model 122), product rate plan charges, subscriptions (e.g., a cellular telephone service subscription with a $39.99 per month recurring flat fee), and/or the like. The UI layer 202 may generate the graphical user interfaces shown in FIGS. 7A-D, FIG. 10, and FIG. 12. The UI layer 202 may cooperate with the services described herein.

The product and subscription service 204 may function to store products, product rate plans, product rate plan charges, and/or subscriptions (e.g., in product and subscription service database 205). The product and subscription service 204 may comprise a set of one or more microservices, and/or the product and subscription service 204 may comprise a feature of a monolithic application.

The product and subscription service 204 may function to generate, store, and/or provide invoices (e.g., to a customer device 106 over data network 104). The product and subscription service 204 may generate invoices in response to a bill run request that may be triggered manually (e.g., by a tenant user), periodically (e.g., monthly), and/or the like. The product and subscription service 204 may generate invoices based on information generated and/or stored by one or more microservices (e.g., usage microservice 206, price calculation microservice 208).

The usage microservice 206 may function to detect usage events. A usage event may include usage of a subscription service managed by the extensible billing system 118 and/or multi-tenant system 102. For example, a usage event may be a one-minute phone conversation associated with a customer subscribed to a cellular telephone service provided by a tenant (e.g., AT&T) of the multi-tenant system 102. The usage microservice 206 may also function to trigger one or more other microservices of the extensible billing system 118. The usage microservice 206 may trigger other microservices (e.g., rating microservice 228) of the extensible billing system 118 based on detected usage events. For example, the usage microservice 206 may generate a rating request in response to detecting a usage event, and provide the rating request to the rating microservice 228. In some embodiments, the usage microservice 206 is not a stateless microservice.

The price calculation microservice 208 may function to generate custom charge models 122 (or, simply, charge models 122). For example, the price calculation microservice 208 may generate charge models 122 based on tenant user input received through the UI layer 202. The tenant user input may specify a data definition that describes system data requirements and/or customer data requirements. System data requirements and customer data requirements may be referred to collectively as data definitions or data requirements. The system data requirements may correspond to system data stored by the computing system (e.g., in datastore 114 and/or datastore 116), and the customer data requirements may correspond to customer data stored by a third-party system of the particular tenant (e.g., third-party tenant system 130).

In some embodiments, a charge model 122 may include data definitions and logic definitions, each of which can be defined by a tenant user. The data definitions may define inputs for the charge model 122, such as customer information (e.g., zip code information), data formats (e.g., five-digits for zip code information), and system information (e.g., payment methods, billing periods, billing frequency). Logic definitions may include one or more operations to be applied using the model inputs. Operations may include applying discounts, up-charges, penalties, rewards, and/or otherwise adjusting other variables used to calculate charges. In some embodiments, the custom charge models 122 may be easily created by tenant users using a self-describing model definition language (e.g., a JSON-based schema language). In one example, a tenant user may be able to define a custom charge model 122 that provides a discount for telephone service usage during a particular period of time (e.g., between 12 AM and 5 AM).

In some embodiments, the price calculation microservice 208 functions to generate custom charge models 122 from predefined charge models (e.g., hard-coded charge models). For example, the price calculation microservice 208 may translate a predefined charge model to the model definition schema language used to define the custom charge models 122, and a tenant user may modify the translated charge model 122.

In some embodiments, the price calculation microservice 208 functions to generate custom charge models 122 from template charge models. For example, template charge models may be charge models 122 with pre-populated and/or unspecified information (e.g., data definitions, logic definitions). The price calculation microservice 208 may modify the template charge models based on user input to generate customs charge models 122. For example, a user may modify default data and/or logic definitions, and/or define blank fields for data and/or logic definitions.

In some embodiments, the price calculation microservice 208 may obtain data pushed from remote systems (e.g., third-party tenant system 130) and/or pull data from remote systems (e.g., third-party tenant system 130). For example, the price calculation microservice 208 may require real-time customer data. Accordingly, a custom charge model 122 may include data and/or logic definitions implementing dynamic price adjustments (e.g., based on supply and demand). For example, a tenant may provide ride-sharing services, and a custom charge model 122 created by that tenant may implement data and/or logic definitions to dynamically calculate charges based on driver supply and/or rider demand at a given time.

In some embodiments, the price calculation microservice 208 is a stateless microservice. In some embodiments, the price calculation microservice 208 is more processor intensive than other microservices (e.g., usage microservice 206), and less memory intensive than other microservices (e.g., usage microservice 206).

In some embodiments, the extensible billing system 118 can scale the microservices based on tenant computing requirements and/or business requirements. For example, the price calculation microservice 208 may be more processor intensive than other microservices (e.g., usage microservice 206), and less memory intensive than other microservices (e.g., usage microservice 206). Accordingly, the extensible billing system 118 may allocate shared resources of the multi-tenant system 102 and/or extensible billing system 118 based on the tenant user requirements. Furthermore, the extensible billing system 118 can dynamically spin-up additional microservices as needed. For example, the extensible billing system 118 can spin-up additional usage microservices 206, price calculation microservices 208, and/or the like.

The rating microservice 228 may function to receive rating requests, store calculated charges determined by the price calculation microservice 208, store additional attributes (e.g., discounts applicable to a particular customer), and/or the like. The rating microservice 228 may also function to obtain subscription information for determining a rated amount (e.g., a calculated charge based on a charge model 122 and one or more additional attributes). The rated amount may be the actual amount used when generating invoices for a customer. The rating microservice 228 may function to store and/or provide rated amounts (e.g., in response to receiving a bill run request).

Although the illustration of the extensible billing 118 starts from a UI layer 202, the extensible billings system 118 can be implemented with application programming interfaces (e.g., RESTful APIs) to interact with backend services. Further, communications between microservices may be API-based. In addition, the communications between the UI layer 202 and backend services may be via APIs.

Figure 3:
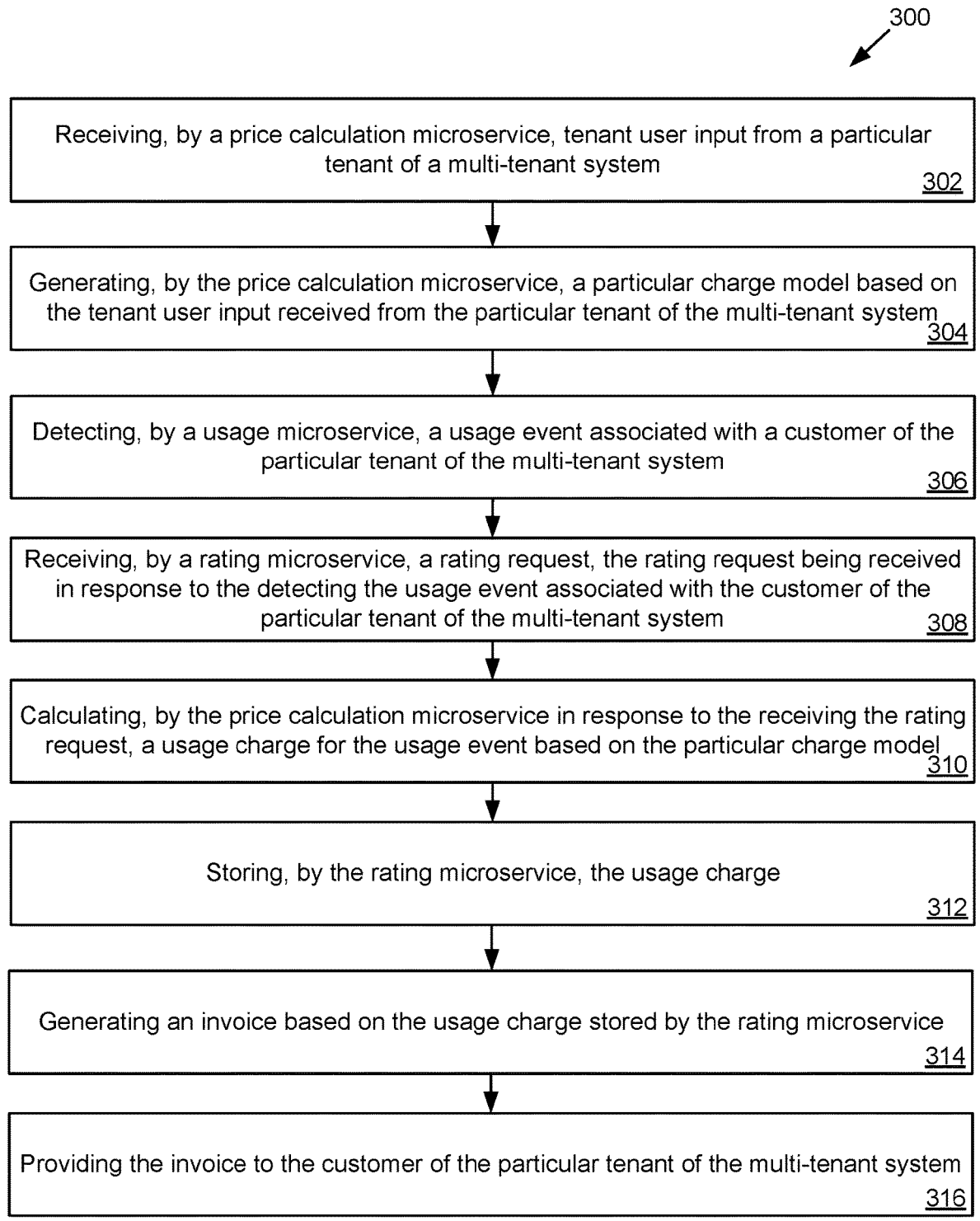
FIG. 3 depicts a flowchart of an example of a method of operation of a multi-tenant system for providing extensible billing according to some embodiments.

FIG. 3 depicts a flowchart of an example of a method 300 of operation of a multi-tenant system for providing extensible billing according to some embodiments. In this and other flowcharts and/or diagrams, the flowchart illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity.

In step 302, a computing system (e.g., multi-tenant system 102 and/or extensible billing system 118) receives tenant user input from a particular tenant (e.g., AT&T) of a multi-tenant system (e.g., multi-tenant system 102). In some embodiments, a price calculation microservice (e.g., price calculation microservice 208) receives the tenant user input via a UI layer (e.g., UI layer 202). In some embodiments, the price calculation microservice receives the tenant user input via an API microservice.

In some embodiments, the tenant user input comprises a data definition and a logic definition. The data definition may define data requirements for calculating the usage charge, and the logic definition may define one or more operations capable of being performed on data corresponding to the data requirements when calculating a usage charge.

In some embodiments, the data definition defines system data requirements and customer data requirements. The system data requirements may correspond to system data stored by the computing system (e.g., in datastore 114 and/or datastore 116), and the customer data requirements may correspond to customer data stored by a third-party system of the particular tenant (e.g., third-party tenant system 130).

In step 304, the computing system generates a particular charge model (e.g., a charge model 122) based on the tenant user input received from the particular tenant of the multi-tenant system. The particular charge model may be generated in response to receiving the tenant user input from the particular tenant of the multi-tenant system. In some embodiments, the price calculation microservice generates the particular charge model. More specifically, a model definition component (e.g., model definition component 216) and/or a calculation logic component (e.g., calculation logic component 218) may generate the particular charge model.

In step 306, the computing system detects a usage event associated with a customer (e.g., John Smith) of the particular tenant of the multi-tenant system. In some embodiments, a usage microservice detects the usage event.

In step 308, the computing system receives a rating request. The rating request may be received in response to detecting the usage event associated with the customer of the particular tenant of the multi-tenant system. In some embodiments, a rating microservice (e.g., rating microservice 228) receives the rating request.

In step 310, the computing system calculates a usage charge for the usage event based on the particular charge model. In some embodiments, the price calculation microservice calculates the usage charge using the particular charge model. More specifically, the calculation logic component and/or a calculation logic execution environment (e.g., calculation logic execution environment 224) may calculate the usage event.

In step 312, the computing system stores the usage charge. In some embodiments, the rating microservice stores the usage charge in a rating microservice database (e.g., database 229).

In step 314, the computing system generates an invoice based on the usage charge stored by the rating microservice. In step 316, the computing system provides the invoice to the customer (e.g., a customer device 106 of John Smith) of the particular tenant of the multi-tenant system.

Figure 4:
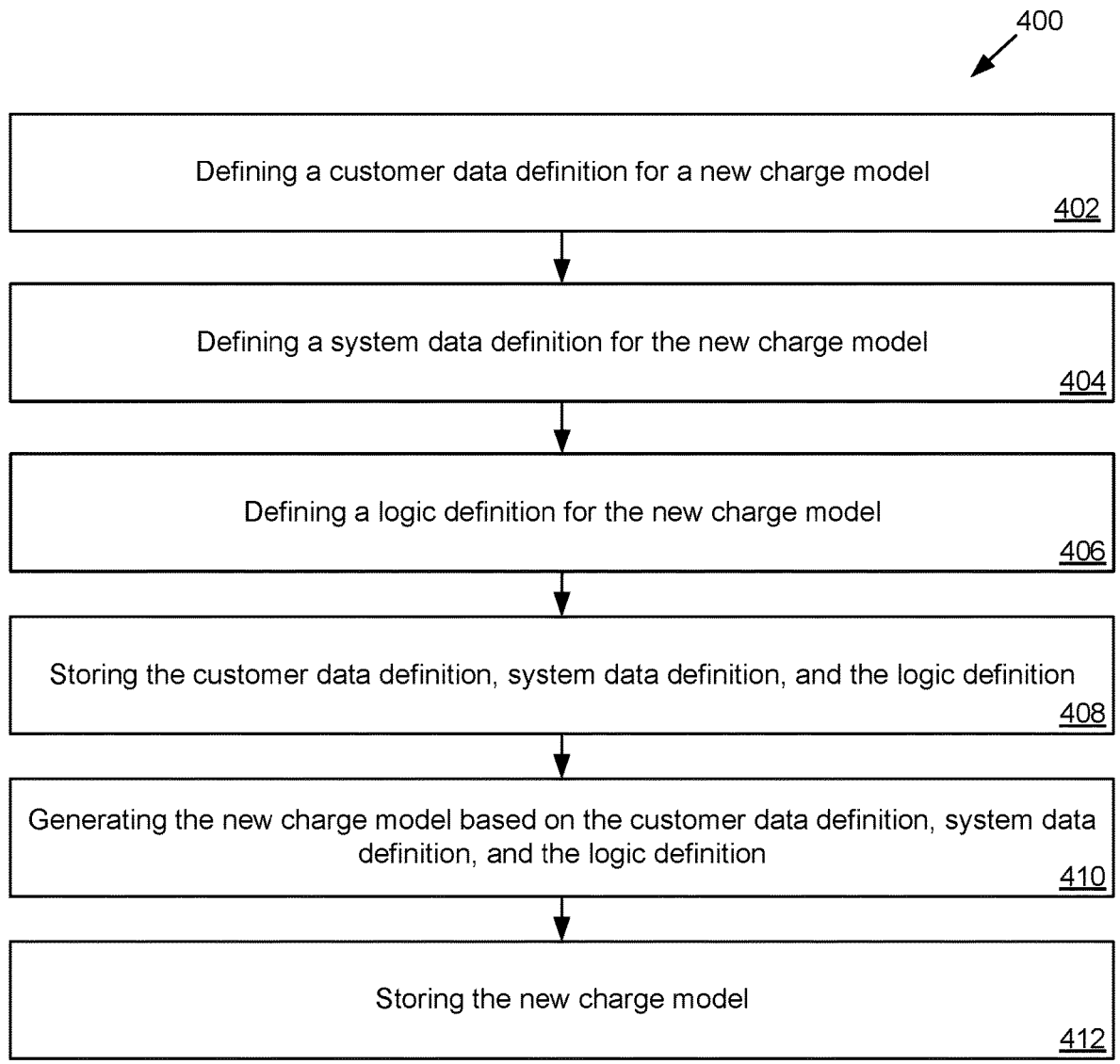
FIG. 4 depicts a flowchart of an example of a method of creating a charge model according to some embodiments.

FIG. 4 depicts a flowchart of an example of a method 400 of creating a charge model according to some embodiments.

In step 402, a computing system (e.g., multi-tenant system 102 and/or extensible billing system 118) defines customer data requirements (or, descriptions or definitions) for customer data (e.g., customer data 132) used when calculating a charge with the new charge model (e.g., charge model 122) being created. For example, the customer data requirements may define customer attributes (e.g., personal information). The customer data may be stored by a remote system (e.g., third-party tenant system 130). In some embodiments, the customer data requirements are defined based on user input (e.g., input from an administrator of tenant AT&T) received through a graphical user interface generated by a UI layer (e.g., UI layer 202).

In step 404, the computing system defines system data requirements (or, descriptions or definitions) for system data used when calculating a charge with the new charge model being created. For example, the system data requirements may define payment methods (e.g., credit card), billing periods, billing frequencies, and/or the like. The system data may be stored by the computing system. In some embodiments, the system data requirements are defined based on user input (e.g., input from an administrator of tenant AT&T) received through a graphical user interface generated by the UI layer.

In step 406, the computing system defines a logic definition. The logic definition may comprise a set of functions to operate on the customer data and the system data corresponding to the customer data requirements and the system data requirements. In step 408, the computing system stores the customer data definitions and the system data definitions (or, collectively, data definitions) and the logic definitions. In step 410, the computing system stores the data definitions and the logic definitions. In step 412, the computing system generates the new charge model based on the data definitions and the logic definitions. In step 414, the computing system stores the new charge model.

Figure 5:
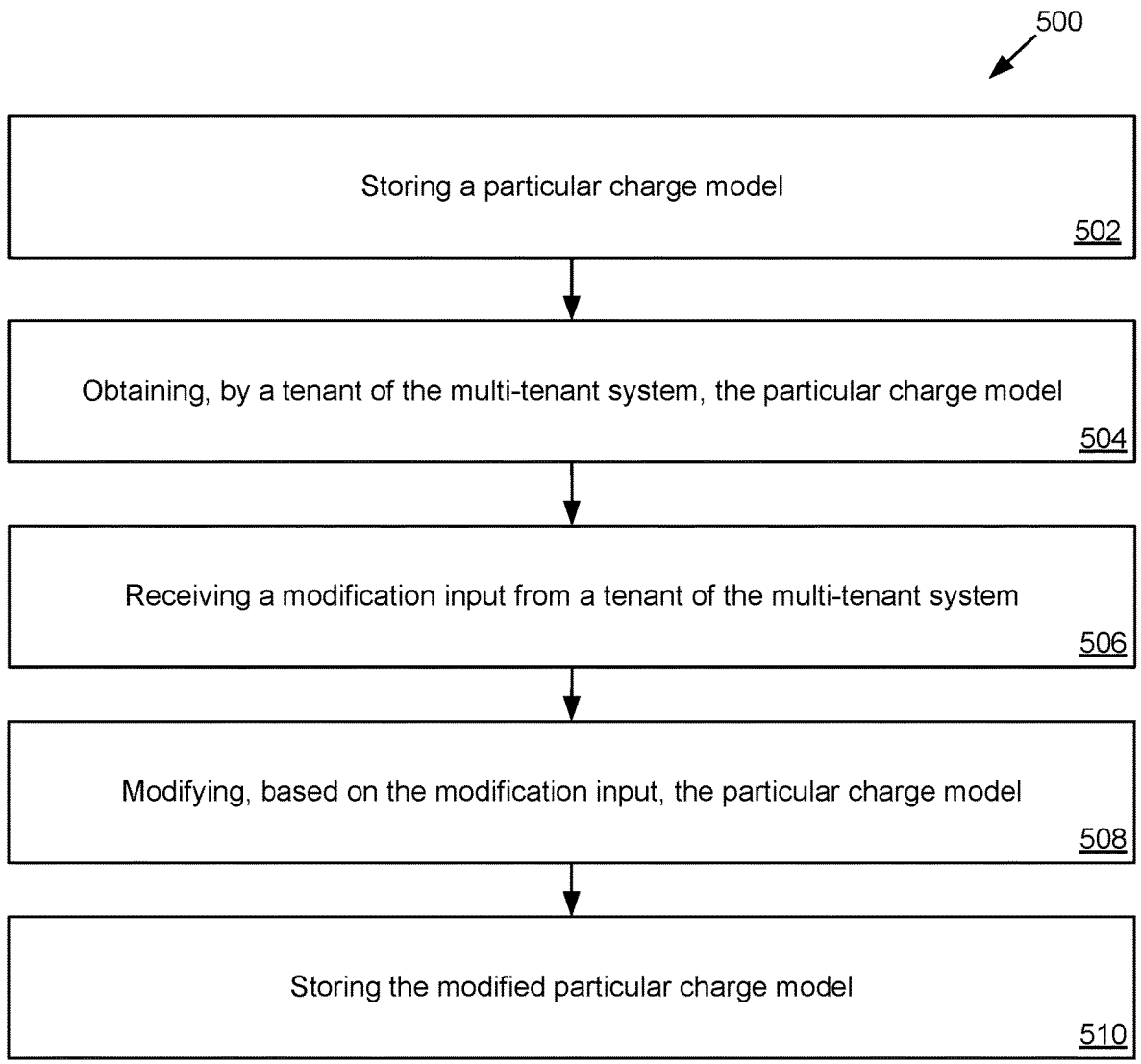
FIG. 5 depicts a flowchart of an example of a method of sharing and modifying a charge model according to some embodiments.

FIG. 5 depicts a flowchart of an example of a method 500 of sharing and modifying a charge model according to some embodiments.

In step 502, a computing system (e.g., multi-tenant system 102 and/or extensible billing system 118) stores a particular charge model (e.g., charge model 122). The particular charge model may be a new charge model (e.g., as created using the systems and methods described herein), a predetermined charge model (e.g., a hard-coded charge model manually created by a developer associated with the computing system), and/or template charge model (e.g., a charge model with a set of default and/or modifiable attributes, such as data definitions, logic definitions, and/or the like).

In step 504, the computing system obtains the particular charge model. For example, a tenant (e.g., AT&T) that previously created a new charge model may obtain the new charge model. In another example, a tenant (e.g., Verizon) may obtain a new charge model previously created by another tenant (e.g., AT&T). In some embodiments, the tenant that created the new charge model may control (e.g., via control attributes stored in the charge model and/or otherwise associated with the charge model) when other tenants may access new charge models they created. In some embodiments, some or all new charge models may be accessed by some or all tenants of the multi-tenant system.

In step 506, the computing system receives a modification input from a tenant of the multi-tenant system. The modification input may include a different data definition, a different logic definitions, and/or other different attribute of the particular charge model. For example, a user may interact with a GUI generated by the UI layer to modify attributes of the particular charge model.

In step 508, the computing system modifies the particular charge model based on the modification input. In step 510, the computing system stores the modified charge model.

Figure 6:
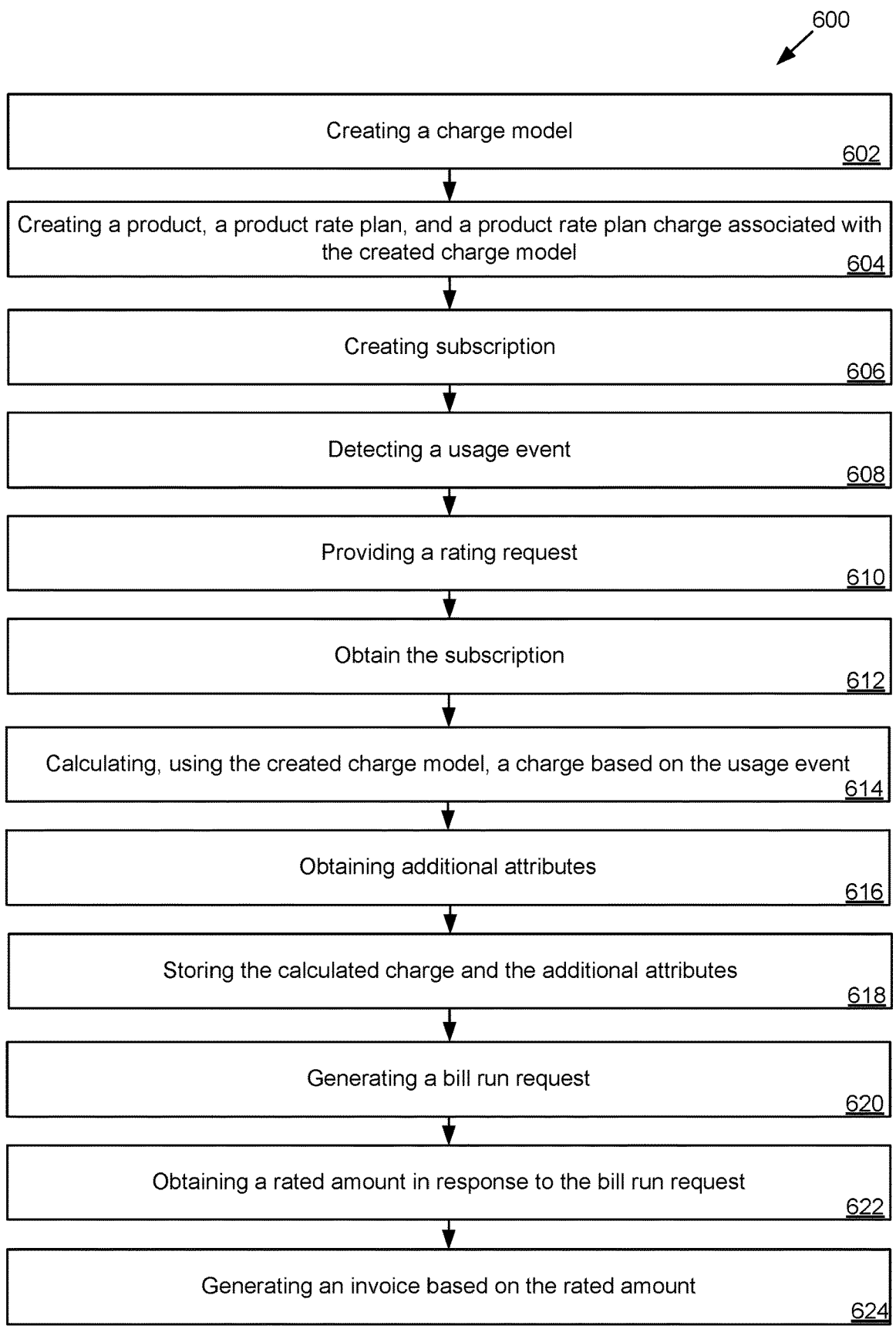
FIG. 6 depicts a flowchart of an example of a method of operation of a multi-tenant system for providing extensible billing according to some embodiments.
Figure 7A:
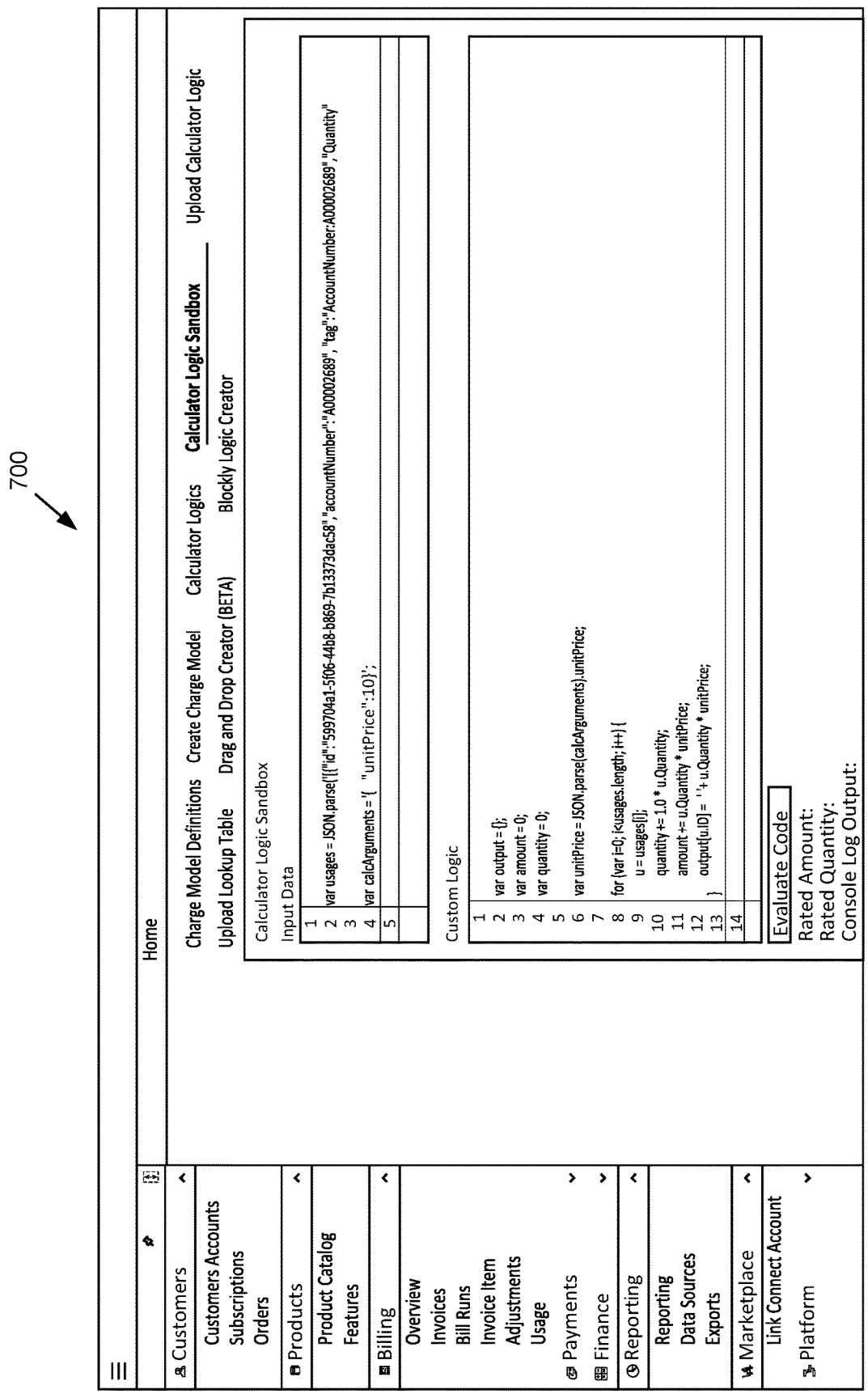

FIG. 6 depicts a flowchart of an example of a method 600 of operation of a multi-tenant system for providing extensible billing according to some embodiments.

In step 602, a computing system (e.g., multi-tenant system 102 and/or extensible billing system 118) creates a new charge model. In some embodiments, a price calculation microservice (e.g., price calculation microservice 228) creates the new charge model.

In step 604, the computing system creates a product, a product rate plan, and a product rate plan charge associated with the created charge model. In some embodiments, a monolithic application of the computing system creates the product, the product rate plan, and the product rate plan charge associated with the created charge model. In other embodiments, a microservice of the computing system creates the product, the product rate plan, and the product rate plan charge associated with the created charge model. As used herein, a microservice may refer to a set of one or more microservices.

In step 606, the computing system creates a subscription. The subscription may include the product, product rate plan, and/or product rate plan charge. In some embodiments the monolithic application of the computing system creates the subscription. In other embodiments, a microservice of the computing system creates the subscription.

In step 608, the computing system detects a usage event. In some embodiments, a usage microservice (e.g., usage microservice 206) detects the usage event.

In step 610, the computing system generates and/or provides a rating request. In some embodiments, the usage microservice generates and/or provides the rating request to a rating microservice (e.g., rating microservice 228).

In step 612, the computing system obtains (e.g., pulls) the subscription. In some embodiments, the rating microservice obtains the subscription from the monolithic application of the computing system. In other embodiments, the rating microservice obtains the subscription from another service (e.g., product and subscription service 204).

In step 614, the computing system calculates, using the created charge model, a charge based on the usage event and/or the subscription. In some embodiments, the price calculation microservice calculates the charge.

In step 616, the computing system obtains additional attributes. Additional attributes may include discounts that may be applicable for a particular customer. For example, a particular customer may be eligible for a discount based on length of time of the subscription, and/or the like. In some embodiments, the price calculation microservice obtains the additional attributes from the monolithic application and/or another service. In some embodiments, the additional attributes may be defined in the created charge model. In some embodiments, the additional attributes are not defined in the created charge model.

In step 618, the computing system stores the calculated charge and the additional attributes. In some embodiments, the rating microservice stores the calculated charge and the additional attributes.

In step 620, the computing system generates a bill run request. In step 622, the computing system obtains a rated amount in response to the bill run request. In some embodiments, the computing system (e.g., the monolithic application) obtains the rated amount from the rating microservice. The rated amount may comprise the calculated charge and/or a modified calculated charge. For example, the computing system may modify the calculated charge using the additional attributes (e.g., applying a discount applicable to the customer to the calculated charge). In step 624, the computing system generates an invoice based on the rated amount.

FIGS. 7A-D depict example graphical user interfaces 700, 720, 740 and 760 for creating a charge model according to some embodiments. The graphical user interface 700 depicts a graphical user interface for implementing (e.g., inputting/specifying) and testing a custom logic definition for a per unit custom charge model 122. This example uses a programming language (e.g., JavaScript) to represent the logic. In some embodiments, logic can be represented as an excel-like formula, a defined domain specific language (e.g., defined by the multi-tenant system 102, extensible billing system 118, and/or entity or entities that own, operate, and/or control the multi-tenant system 102 and/or extensible billing system 118) and possibly other approaches. The graphical user interface 720 depicts a graphical user interface for providing (e.g., uploading) the custom logic definition to the extensible billing system 118. For example, a tenant user may input the information via the graphical user interface 720 presented on a tenant user device, and the information may then be uploaded and saved to the extensible billing system 118. The graphical user interface 740 depicts a graphical user interface for creating a custom per unit charge model 122 with the saved logic definition and specifying other required data. The other required data may include data definitions, additional attributes, and/or the like. The graphical user interface 760 depicts a graphical user interface for selecting and configuring the custom charge model 122 for a charge.

Figure 8:
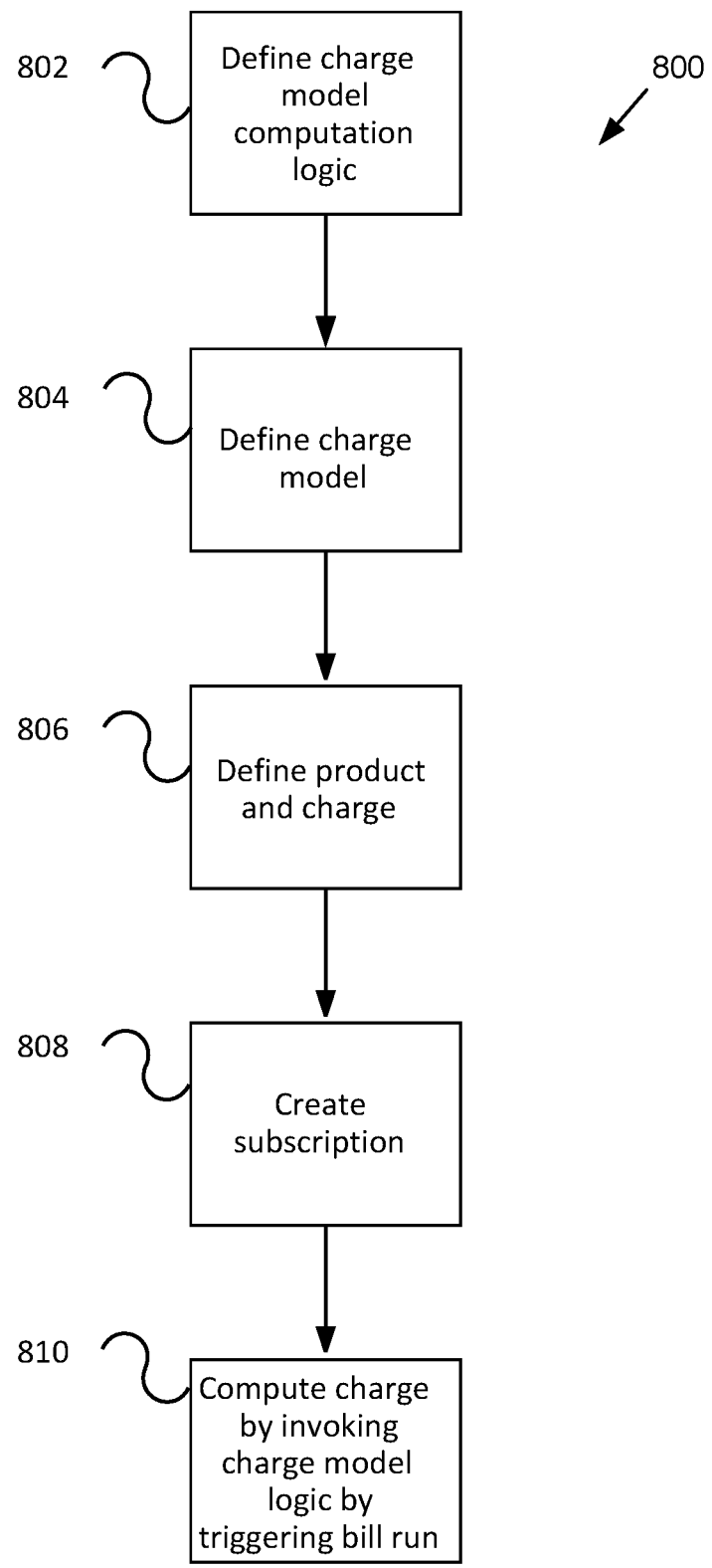
FIG. 8 depicts a flowchart of an example extensible billing system workflow according to some embodiments.

FIG. 8 depicts a flowchart of an example extensible billing system workflow 800 according to some embodiments. The method starts at step 802. In step 802, an account holder (e.g., tenant) of the extensible billing system 118 defines the computation logic of a charge model 122. The computation logic may be a unit of computer code that produces a result to an input. Example input may be a unit price (e.g., $5 for a gigabyte of internet data consumed by an end user). Another example input may be a quantity of internet data available. An example account holder of the extensible billing system 118 may be a representative of a tenant.

The method moves to step 804. In step 804, the account holder creates the charge model 122. A charge model 122 may determine how charges, or costs for end users (or, "customers"), are computed, what input is needed for the computation, and the structure of the input. Example input structure may be volume pricing. For example, volume pricing may include a price table with multiple ranges of volume tiers. Each tier in the price table may have a starting unit, an ending unit, and a list price. For example, if a user purchases anywhere from 0-50 licenses, the user will be charged $10. However, if the user purchases between 51 to 150 licenses, the user will be charged $15.

Next, the method moves to step 806. In step 806, the account holder creates a product and its charges. The product may incorporate charges of the type defined in step 804. Next, the method moves to step 808 in which a subscription is created for an end consumer of the product defined in step 806.

At step 810, a bill run starts. A bill run triggers a rating method in which the computation logic from step 802 is invoked. The result of a bill run may be an invoice for the end customer.

Figure 9:
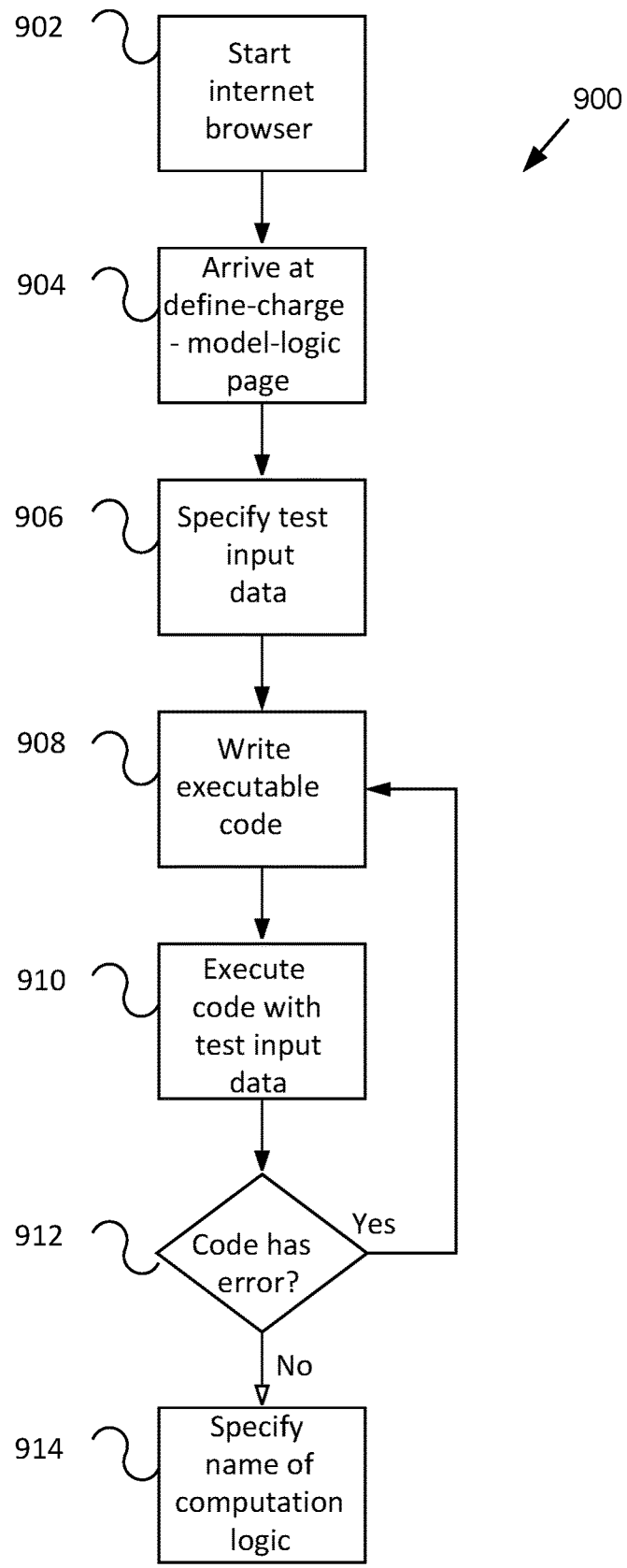
FIG. 9 depicts a flowchart of an example of a method of defining a charge model computation logic according to some embodiments.
Figure 11:
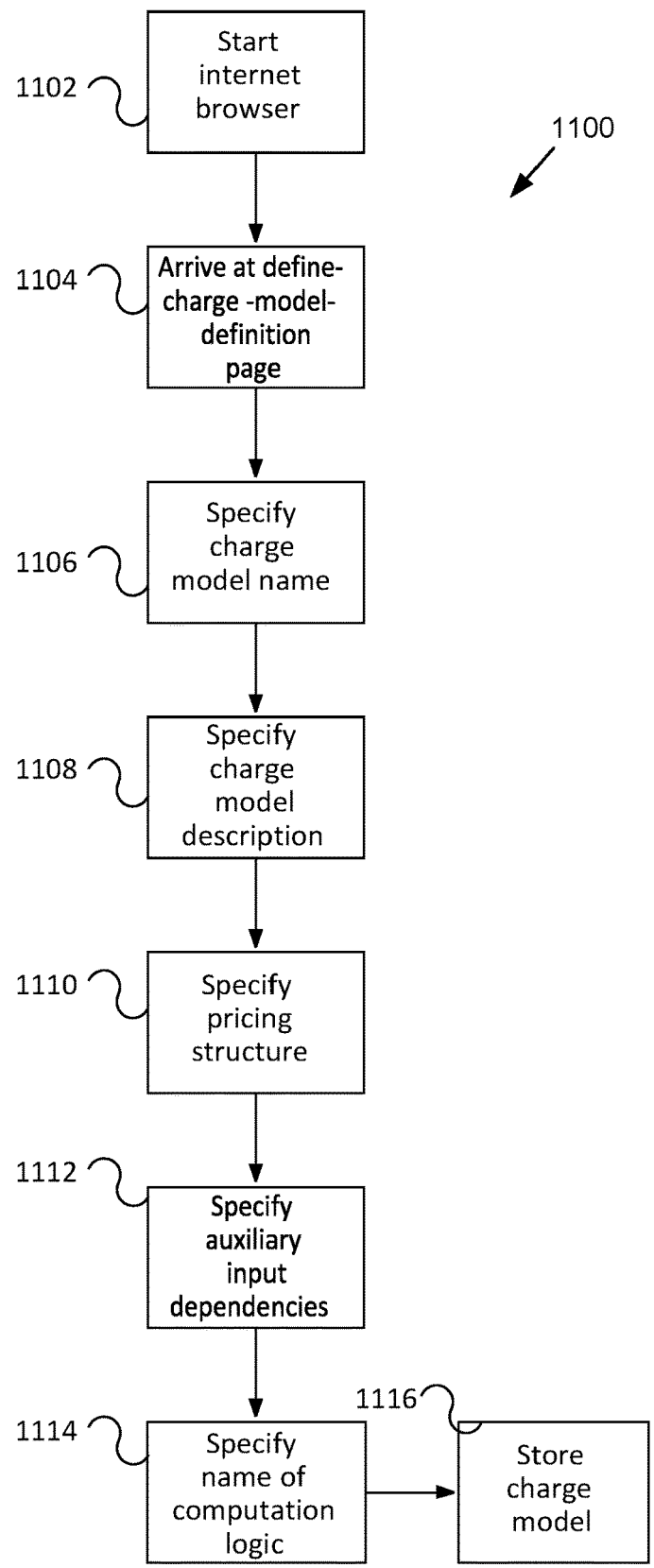
FIG. 11 depicts a flowchart of an example of a method of defining a charge model according to some embodiments.

FIG. 9 depicts a flowchart of an example of a method 900 of defining a charge model computation logic according to some embodiments. FIG. 11 provides an exemplary UI as means to specify input.

Figure 10:
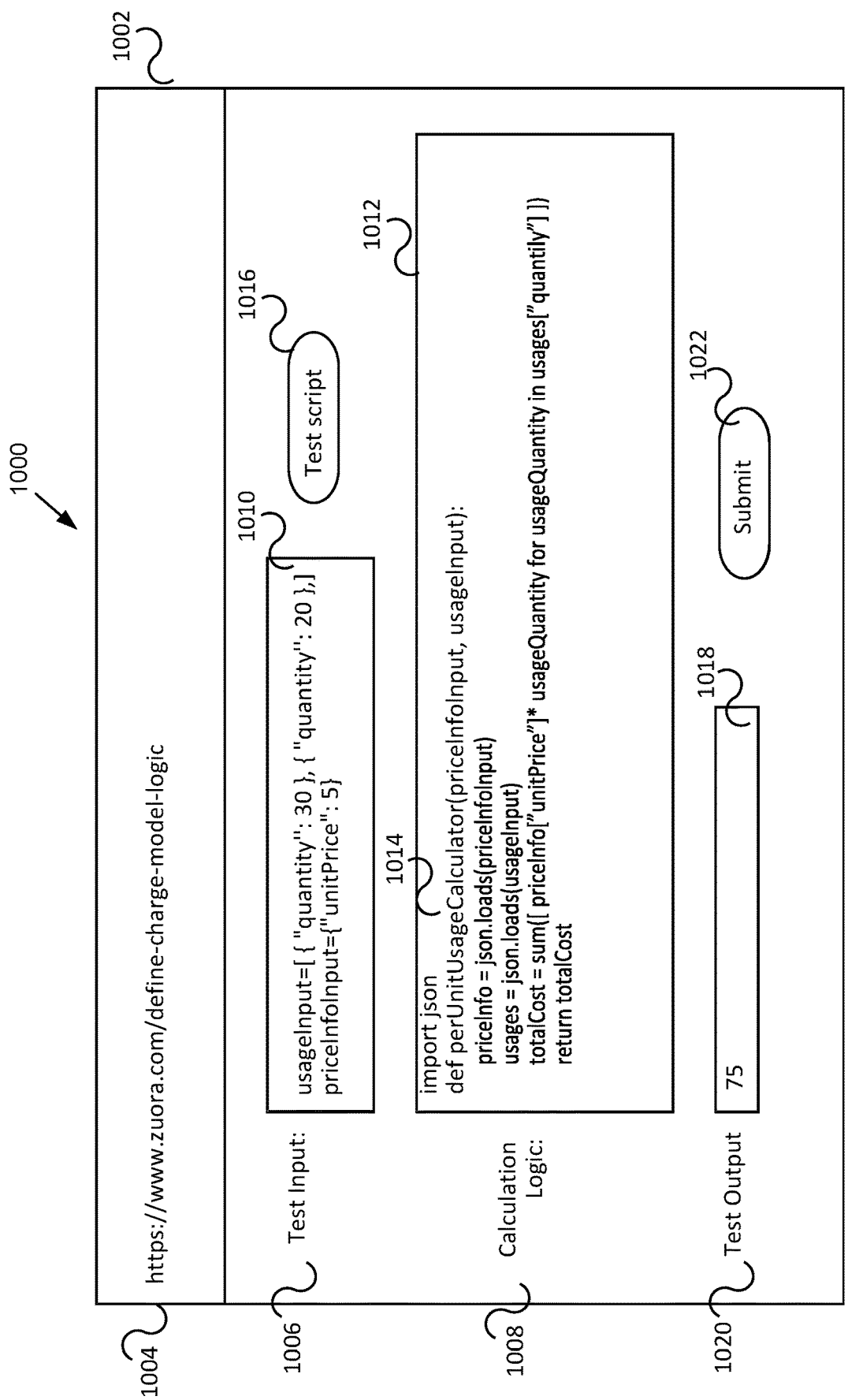
FIG. 10 depicts an exemplary user interface (UI) that users interact with to define a charge model computation logic following the method of FIG. 9 according to some embodiments.

The method 900 begins at step 902. A user opens an internet browser, which displays window. In step 904, the user types the URL in an address bar 1004 as shown in FIG. 10 to arrive at the define-charge-model-logic web page 1002 as shown in FIG. 10.

In step 906, a user specifies the test input 1006 for the calculation logic in textbox 1010 in the exemplary web page 1002. As shown in the text box 1010, an array of usages and a priceInfo objects are specified.

In step 908, a block of executable code is written to receive the test input specified in step 906 and to produce a calculation result. As shown in FIG. 10, sample calculation logic is shown in the input area 1012 with label 1008. In this example, the calculation logic has a name "perUnitUsageCalculator" 1014 and is to receive two parameters: priceInfoInput and usageInput. These input parameters correspond to the test input objects specified in text box 1010.

In step 910, the computation logic is tested with the test input data. The user tests the code by clicking the test script button 1016. Subsequently, the test input in text box 1010 is fed into the computation logic 1014. In this example, both usageInput and priceInfoInput are in JSON format, although they can be in other formats. The perUnitUsageCalcuator 1014 first decodes them into in-memory dictionary objects priceInfo and usages respectively. It loops the usages dictionary and, for each usage object, multiplies the unitPrice, obtained from priceInfo object, with the quantity value of current usage. It sums all the multiplication value(s) arriving at the totalCost. The totalCost is returned and shown in test output area 1018 corresponding with label 1020.

Typically, developing computation logic in code is an iterative process. Therefore, in step 912, it is determined whether the code contains an error. If so, the method returns to step 908 until there is no errors. Once the computation logic is error-free, user clicks the Submit button 1022.

Returning to FIG. 2, after the computation logic 1012 in FIG. 10 is submitted via UI layer 202, the request handler 210 receives a request to store the computation logic 1012, and subsequently calls the calculation logic component 218 to store the computation logic 1012 in the calculation logics storage area 222 within the price calculation microservice 208. The calculation logics storage 222 may be a database. Alternatively, the calculation logics storage 222 may be a file system of script files. The calculation logic storage 222 may be a remote storage service such as AWS S3.

Using the UI layer 202, a tenant user may also define the charge model defined in step 804 of FIG. 8. Details of defining a charge model 122 may be found in FIG. 11 and FIG. 12, elsewhere in this paper.

FIG. 10 depicts an exemplary user interface (UI) 1000 that users interact with to define a charge model computation logic following the method 900 of FIG. 9 according to some embodiments.

FIG. 11 depicts a flowchart of an example of a method of defining a charge model according to some embodiments. In FIG. 11, the flowchart begins at step 1102. The user opens an internet browser, which displays a window. In FIG. 11, the flowchart begins at step 1102. The user opens an internet browser, which displays a window.

In step 1104, the user types the URL in address bar 1204 to arrive at the define-charge-model-definition web page 1202.

Figure 12:
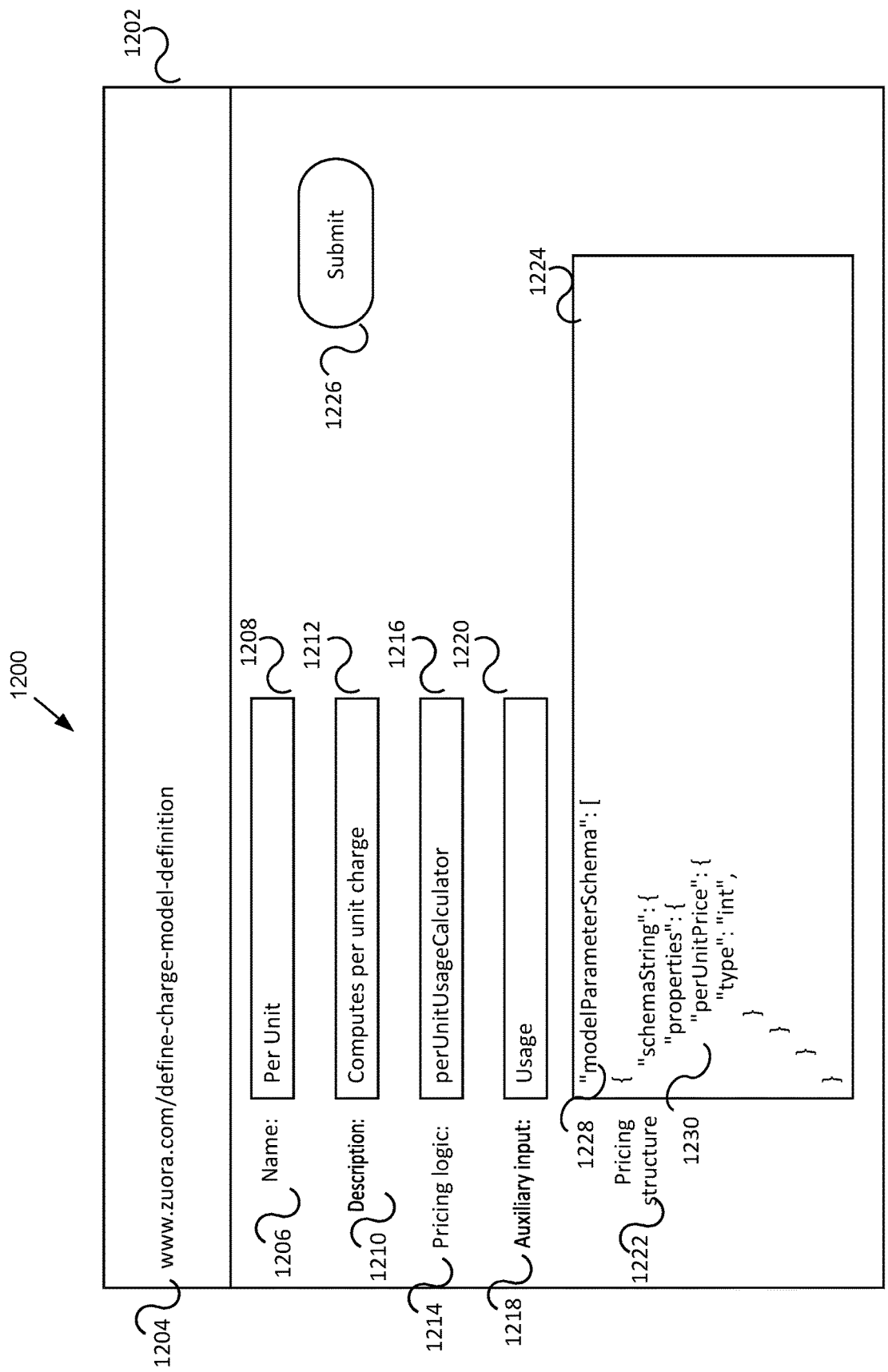
FIG. 12 depicts an exemplary UI that users interacts with to define a charge model following the method of FIG. 11 according to some embodiments.

In step 1106, a user specifies the charge model name 1206 as shown in FIG. 12 in the input area 1208 of FIG. 12.

In step 1108, the user specifies the charge model description 1210 in the input field 1212. In step 1110, the user specifies the pricing structure 1222 in the input field 1224. Although in 1224, an exemplary pricing structure is define in JSON format, it can be in other formats such as XML. The pricing structure defines the parameters required for the charge model and is known as modelParameterSchema 1228, within which a property perUnitPrice of type "int" 1230 is specified. This means for the Per Unit 1206 charge model, one price input field is required, and the input type is expected to be an integer type.

Often for a charge model 122, only specifying price input for a calculation is insufficient. For example, as shown in the perUnitUsageCalculator 1014 in FIG. 10, usageInput is also required. These other inputs may be referred to as auxiliary input dependencies. In step 1112, the user defining a charge model 122 may be required to specify the auxiliary input dependencies at step 1112 in FIG. 11. As shown in FIG. 12, an input field 1220 with label 1218 allows users to specify usage as a dependency.

In step 1114, users specify the name of the computation logic. This computation logic may have been created by steps of FIG. 9, and stored in the calculation logics storage area in FIG. 2. As an example, the pricing logic input area 1216 with label 1214 of FIG. 12 has the value perUnitUsageCalculator, which is the name defined in step 1014 of FIG. 10.

In step 1116, the user stores the charge model 122 by clicking the submit button 1226 of FIG. 12, concluding the method of defining a charge model 122 for this tenant.

Returning FIG. 2, after the charge model definition is submitted via UI layer 202, the request handler 210 receives a request, and subsequently uses the model definition component 216 to store the charge model definition in the database 220.

After a user of the billing system creates a charge model 122 and its calculation logic, the user can proceed to creating a product and product rate plan charges in step 806 and subscriptions in step 808 of FIG. 8. The product and subscription service 204 stores the resulting product, product rate plan charge and subscriptions.

In step 810, a bill run is triggered. In FIG. 2, users of the extensible billing system 118 can trigger a bill run request via the UI layer 202. The bill run in turn triggers a rating process. The result is the rated dollar amount that an end customer needs to pay. The details of the rating process within a bill run is described with reference to FIG. 2 and FIG. 13.

FIG. 12 depicts an exemplary UI 1200 that tenant users interact with to define a charge model 122 following the method 1100 of FIG. 11 according to some embodiments.

Figure 13:
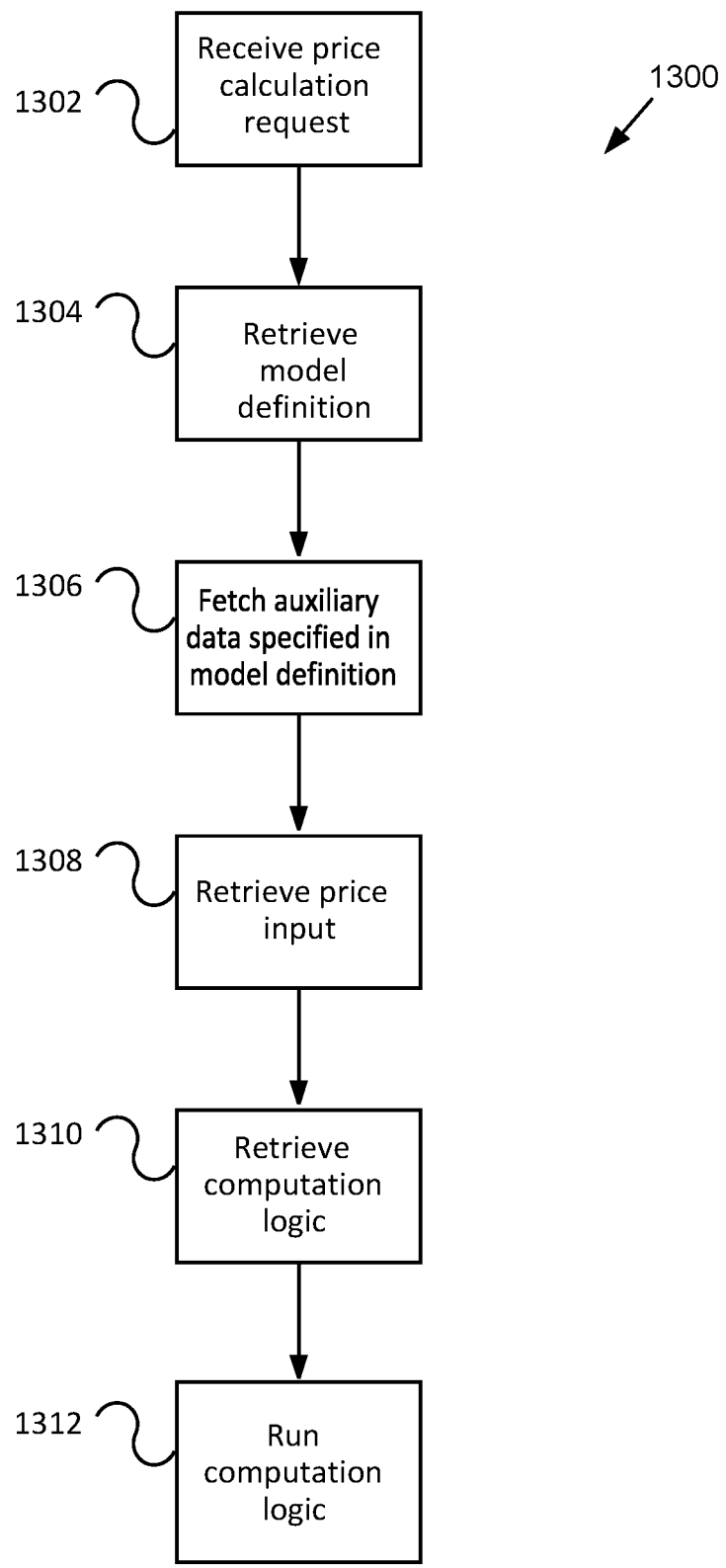
FIG. 13 depicts a flowchart of an example of a rating method which invokes the user defined charge model computation logic according to some embodiments.

FIG. 13 depicts a flowchart of an example of a rating method 1300 which invokes the user defined charge model 122 computation logic according to some embodiments. The rating method 1300 begins in step 1302 by receiving a price calculation request. In some embodiments, UI layer 202 sends a request to the request handler 210 in the price calculation microservice 208. The request handler 210 receives the calculation request, which contains the charge information, which includes a reference to the price input required, a time period within which usages falls in, and a reference to the price input required for the current calculation.

In step 1304, the request handler 210 of FIG. 2 retrieves the model definition stored in database 220 via the model definition component 216. The charge model previously defined includes a reference to the computation logic as well as the auxiliary data type which will be required in later steps. In the example used herein, the auxiliary data type is the usage data.

In step 1306, the request handler 210 fetches usage data that falls within the time period specified by the rating request. The request handler 210 uses the usage fetch component 212 to fetch the usages from the usage microservice 206.

In step 1308, the request handler 210 retrieves price information. The request handler 210 uses the price input component 214 to retrieve the price information from database 220.

In step 1310, the request handler retrieves the computation logic. The request handler 210 uses the calculation logic component 218 to retrieve the calculation logic using its name, for example, a unique name.

At this point, the price information, the usages, the model definition and calculation logic have all been retrieved and are ready for the final calculation. In step 1312, the calculation logic component 218 executes the calculation logic using the price information and usages as input. The execution of the calculation logic may be hosted in a calculation logic execution environment 224. In some embodiments, the execution environment may be the Amazon Web Service's lambda execution environment. When the calculation is complete, the result is returned to the calculation logic component 218 and subsequently returned and shown on the UI layer 202 as a rated result.

In some embodiments, the extensible billing system 118 and/or multi-tenant system 102 may provide a scalable platform that allows hosting of computation unit wherein the computation unit computes pricing information when given complex inputs based on billing requirement or billing period for example. Complex input may include usage record, tenant time zone, and currency. Input information may be stored in remote systems, which may be fetched when needed. The computation unit may be dynamically loaded and unloaded based on system resource, to support auto scaling.

Figure 14:
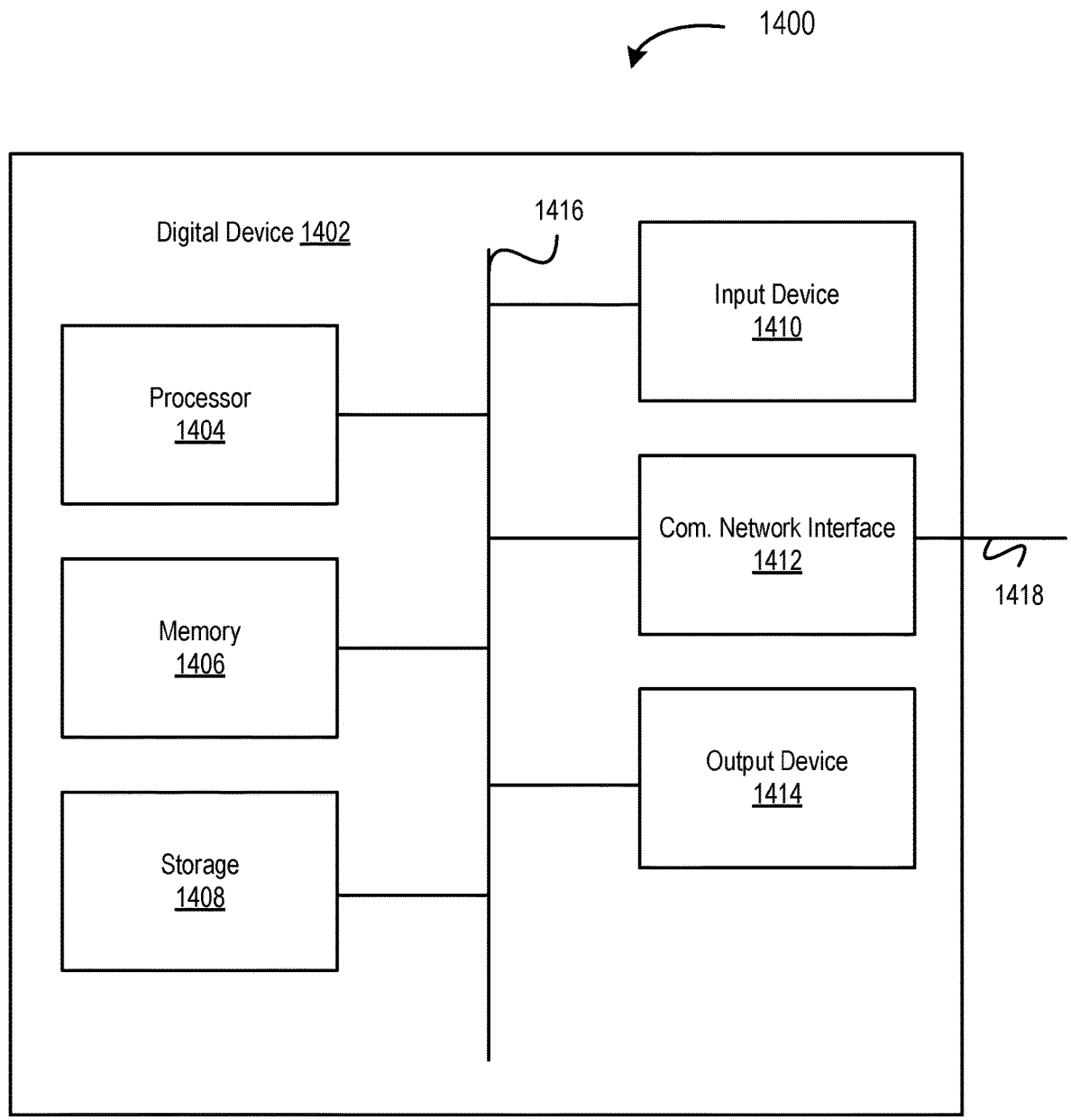
FIG. 14 depicts a diagram of an example computer system for implementing the features disclosed herein according to some embodiments.

FIG. 14 depicts a diagram 1400 of an example of a computing device 1402. Any of the systems, engines, datastores, and/or networks described herein may comprise an instance of one or more computing devices 1402. In some embodiments, functionality of the computing device 1402 is improved to the perform some or all of the functionality described herein. The computing device 1402 comprises a processor 1404, memory 1406, storage 1408, an input device 1410, a communication network interface 1412, and an output device 1414 communicatively coupled to a communication channel 1416. The processor 1404 is configured to execute executable instructions (e.g., programs). In some embodiments, the processor 1404 comprises circuitry or any processor capable of processing the executable instructions.

The memory 1406 stores data. Some examples of memory 1406 include storage devices, such as RAM, ROM, RAM cache, virtual memory, etc. In various embodiments, working data is stored within the memory 1406. The data within the memory 1406 may be cleared or ultimately transferred to the storage 1408.

The storage 1408 includes any storage configured to retrieve and store data. Some examples of the storage 1408 include flash drives, hard drives, optical drives, cloud storage, and/or magnetic tape. Each of the memory system 1406 and the storage system 1408 comprises a computer-readable medium, which stores instructions or programs executable by processor 1404.

The input device 1410 is any device that inputs data (e.g., mouse and keyboard). The output device 1414 outputs data (e.g., a speaker or display). It will be appreciated that the storage 1408, input device 1410, and output device 1414 may be optional. For example, the routers/switchers may comprise the processor 1404 and memory 1406 as well as a device to receive and output data (e.g., the communication network interface 1412 and/or the output device 1414).

The communication network interface 1412 may be coupled to a network (e.g., network 104) via the link 1418. The communication network interface 1412 may support communication over an Ethernet connection, a serial connection, a parallel connection, and/or an ATA connection. The communication network interface 1412 may also support wireless communication (e.g., 802.11 a/b/g/n, WiMax, LTE, WiFi). It will be apparent that the communication network interface 1412 may support many wired and wireless standards.

It will be appreciated that the hardware elements of the computing device 1402 are not limited to those depicted in FIG. 14. A computing device 1402 may comprise more or less hardware, software and/or firmware components than those depicted (e.g., drivers, operating systems, touch screens, biometric analyzers, and/or the like). Further, hardware elements may share functionality and still be within various embodiments described herein. In one example, encoding and/or decoding may be performed by the processor 1404 and/or a co-processor located on a GPU (i.e., NVidia).

It will be appreciated that an "engine," "system," "datastore," and/or "database" may comprise software, hardware, firmware, and/or circuitry. In one example, one or more software programs comprising instructions capable of being executable by a processor may perform one or more of the functions of the engines, datastores, databases, or systems described herein. In another example, circuitry may perform the same or similar functions. Alternative embodiments may comprise more, less, or functionally equivalent engines, systems, datastores, or databases, and still be within the scope of present embodiments. For example, the functionality of the various systems, engines, datastores, and/or databases may be combined or divided differently. The datastore or database may include cloud storage. It will further be appreciated that the term "or," as used herein, may be construed in either an inclusive or exclusive sense. Moreover, plural instances may be provided for resources, operations, or structures described herein as a single instance.

The datastores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

The systems, methods, engines, datastores, and/or databases described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The present invention(s) are described above with reference to example embodiments. It will be apparent to those skilled in the art that various modifications may be made and other embodiments may be used without departing from the broader scope of the present invention(s). Therefore, these and other variations upon the example embodiments are intended to be covered by the present invention(s).

The invention claimed is:

1. A computing system comprising:
one or more processors; and
memory storing instructions that, when executed by the one or more processors, cause the computing system to perform:
receiving, by a price calculation microservice, tenant user input from a particular tenant of a multi-tenant system;
generating, by the price calculation microservice, a particular charge model based on the tenant user input received from the particular tenant of the multi-tenant system;
detecting, by a usage microservice, a usage event associated with a customer of the particular tenant of the multi-tenant system;
receiving, by a rating microservice, a rating request, the rating request being received in response to the detecting the usage event associated with the customer of the particular tenant of the multi-tenant system;

calculating, by the price calculation microservice in response to the receiving the rating request, a usage charge for the usage event based on the particular charge model;

storing, by the rating microservice, the usage charge;

generating an invoice based on the usage charge stored by the rating microservice; and providing the invoice to the customer of the particular tenant of the multi-tenant system.

2. The system of claim 1, wherein the tenant user input comprises a data definition and a logic definition, the data definition defining data requirements for calculating the usage charge, and the logic definition defining one or more operations capable of being performed on data corresponding to the data requirements when calculating the usage charge.

3. The system of claim 2, wherein the data definition defines system data requirements and customer data requirements, the system data requirements corresponding to system data stored by the computing system, and the customer data requirements corresponding to customer data stored by a third-party system of the particular tenant.

4. The system of claim 1, wherein the particular charge model is generated in response to the receiving the tenant user input from the particular tenant of the multi-tenant system.

5. The system of claim 1, wherein the particular charge model is generated from a template charge model.

6. The system of claim 1, wherein the tenant user input is received through an interface microservice.

7. The system of claim 6, wherein the interface microservice comprises a graphical user interface microservice.

8. The system of claim 6, wherein the interface microservice comprises an application programming interface (API) microservice.

9. The system of claim 1, wherein the instructions further cause the system to perform:

storing the particular charge model;

obtaining, by another tenant of the multi-tenant system, the particular charge model;

receiving, by another price calculation microservice, a modification input from the another tenant of the multi-tenant system;

modifying, by the another price calculation microservice based on the modification input, the particular charge model; and storing the modified particular charge model.

10. The system of claim 1, wherein the price calculation microservice is stateless and the usage microservice is not stateless.

11. A method being implemented by a computing system including one or more physical processors and non-transitory storage media storing machine-readable instructions, the method comprising:

receiving, by a price calculation microservice, tenant user input from a particular tenant of a multi-tenant system;

generating, by the price calculation microservice, a particular charge model based on the tenant user input received from the particular tenant of the multi-tenant system;

detecting, by a usage microservice, a usage event associated with a customer of the particular tenant of the multi-tenant system;

receiving, by a rating microservice, a rating request, the rating request being received in response to the detecting the usage event associated with the customer of the particular tenant of the multi-tenant system;

calculating, by the price calculation microservice in response to the receiving the rating request, a usage charge for the usage event based on the particular charge model;

storing, by the rating microservice, the usage charge;

generating an invoice based on the usage charge stored by the rating microservice; and providing the invoice to the customer of the particular tenant of the multi-tenant system.

12. The method of claim 11, wherein the tenant user input comprises a data definition and a logic definition, the data definition defining data requirements for calculating the usage charge, and the logic definition defining one or more operations capable of being performed on data corresponding to the data requirements when calculating the usage charge.

13. The method of claim 12, wherein the data definition defines system data requirements and customer data requirements, the system data requirements corresponding to system data stored by the computing system, and the customer data requirements corresponding to customer data stored by a third-party system of the particular tenant.

14. The method of claim 11, wherein the particular charge model is generated in response to the receiving the tenant user input from the particular tenant of the multi-tenant system.

15. The method of claim 11, wherein the particular charge model is generated from a template charge model.

16. The method of claim 11, wherein the tenant user input is received through an interface microservice.

17. The method of claim 16, wherein the interface microservice comprises a graphical user interface microservice.

18. The method of claim 16, wherein the interface microservice comprises an application programming interface (API) microservice.

19. The method of claim 11, further comprising:

storing the particular charge model;

obtaining, by another tenant of the multi-tenant system, the particular charge model;

receiving, by another price calculation microservice, a modification input from the another tenant of the multi-tenant system;

modifying, by the another price calculation microservice based on the modification input, the particular charge model; and storing the modified particular charge model.

20. The method of claim 11, wherein the price calculation microservice is stateless and the usage microservice is not stateless.

* * * * *